(12) United States Patent
Kwiatkowski

(10) Patent No.: US 12,639,373 B2
(45) Date of Patent: May 26, 2026

(54) SPATIALLY PARTITIONED IDEALLY CHUNKED ENTITY TREE

(71) Applicant: Microsoft Technology Licensing, LLC, Redmond, WA (US)

(72) Inventor: Paul Jerome Kwiatkowski, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/513,129

(22) Filed: Nov. 17, 2023

(65) Prior Publication Data

US 2025/0165533 A1 May 22, 2025

(51) Int. Cl.
*G06F 16/901* (2019.01)
*G06F 16/93* (2019.01)
*G06Q 10/10* (2023.01)
*G06Q 10/101* (2023.01)

(52) U.S. Cl.
CPC .......... *G06F 16/9027* (2019.01); *G06F 16/93* (2019.01); *G06Q 10/101* (2013.01); *G06Q 10/103* (2013.01)

(58) Field of Classification Search
CPC .............................. G06F 16/9027; G06F 16/93
See application file for complete search history.

(56) References Cited

U.S. PATENT DOCUMENTS

| | | | |
|---|---|---|---|
| 6,212,534 B1 * | 4/2001 | Lo ......................... | G06Q 10/10 |
| | | | 715/255 |
| 11,030,187 B1 | 6/2021 | Boodman | |
| 2011/0035376 A1 * | 2/2011 | Kirshenbaum ....... | G06F 16/137 |
| | | | 707/E17.044 |
| 2019/0102370 A1 | 4/2019 | Nelson et al. | |
| 2020/0053176 A1 | 2/2020 | Jimenez Salgado | |
| 2021/0081605 A1 | 3/2021 | Smith | |
| 2025/0355851 A1 | 11/2025 | Kwiatkowski | |

OTHER PUBLICATIONS

"Microsoft / FluidFramework", Retrieved from: https://github.com/microsoft/FluidFramework/commits/ba251d0c7842ef8af4e639ff081eb94e09280a2e/packages/dds/tree/docs/storage/treeStorage.md?, browsing_rename_history=true&new_path=experimental/dds/tree2/docs/main/tree-storage.md&original_branch=main, Sep. 27, 2023, 1 Page.

(Continued)

*Primary Examiner* — Brittany N Allen

(57) ABSTRACT

Systems and methods for providing a Spatially Partitioned Ideally Chunked Entity ("SPICE") tree data structure are provided herein. In an example, a computerized method for using a SPICE tree includes determining a document defined by a SPICE tree data structure and navigating to content within the document based on the SPICE tree data structure. The SPICE tree data structure includes a root chunk containing radar nodes and a plurality of chunks. Each chunk includes one or more object nodes, each of which corresponds to a document attribute. Each of the radar nodes includes a reference to one of the chunks and the object nodes include a placeholder node that provides a reference to another chunk based on a position of the placeholder node within the respective chunk. The root chunk and the chunks are arranged in a hierarchical arrangement with the root chunk being a parent to the chunks.

18 Claims, 10 Drawing Sheets

(56) References Cited

OTHER PUBLICATIONS

"Persistent data structure", Retrieved from: https://en.wikipedia.org/wiki/Persistent_data_structure, Sep. 1, 2023, 15 Pages.

Notice of Allowance mailed on Oct. 8, 2025, in U.S. Appl. No. 18/664,548, 7 Pages.

International Search Report and Written Opinion received for PCT Application No. PCT/US2025/017091, mailed on Jul. 1, 2025, 15 pages.

Leibenger et al., sec-cs: Getting The Most Out of Untrusted Cloud Storage, 42nd Conference on Local Computer Networks, IEEE, Oct. 2017, pp. 623-631.

Non-Final Office Action mailed on Jul. 16, 2025, in U.S. Appl. No. 18/664,548, 24 pages.

* cited by examiner

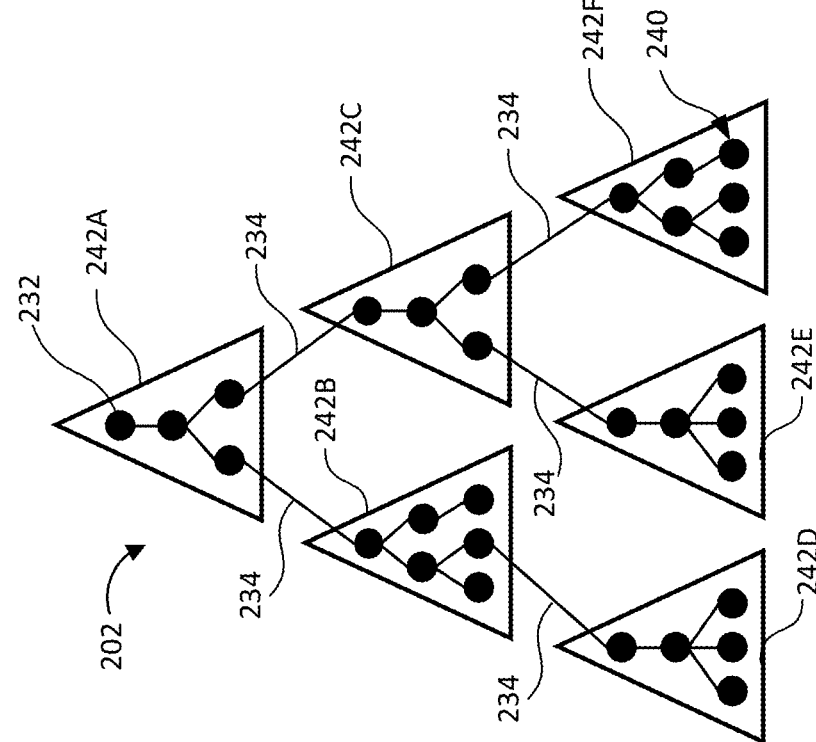
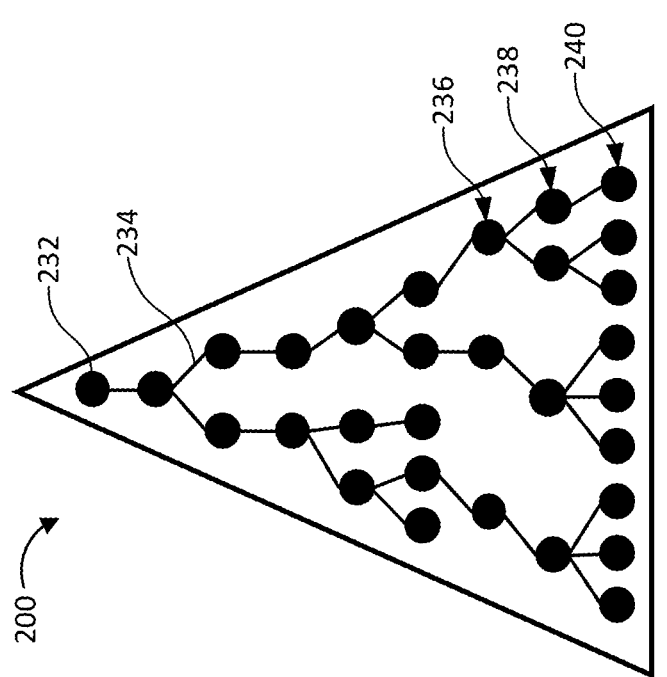
*FIG. 2*

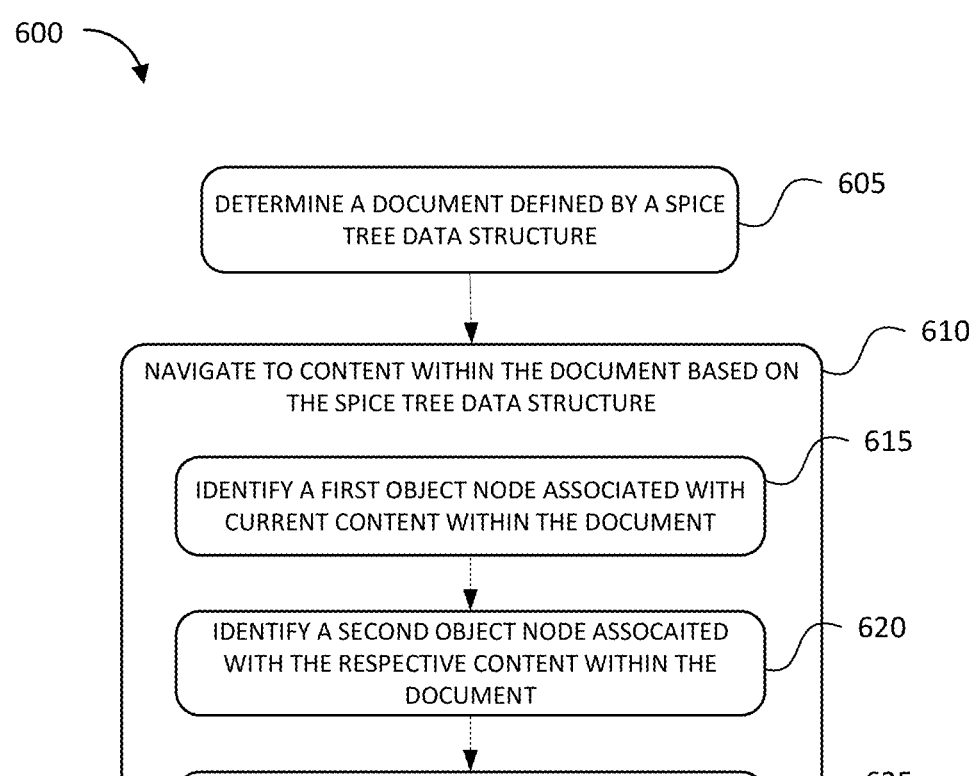

600

DETERMINE A DOCUMENT DEFINED BY A SPICE TREE DATA STRUCTURE — 605

NAVIGATE TO CONTENT WITHIN THE DOCUMENT BASED ON THE SPICE TREE DATA STRUCTURE — 610

IDENTIFY A FIRST OBJECT NODE ASSOCIATED WITH CURRENT CONTENT WITHIN THE DOCUMENT — 615

IDENTIFY A SECOND OBJECT NODE ASSOCAITED WITH THE RESPECTIVE CONTENT WITHIN THE DOCUMENT — 620

TRAVERSE OBJECT NODES WITHIN THE FIRST CHUNK UNTIL A PLACEHOLDER NODE IS ENCOUNTERED — 625

RESPONSIVE TO ENCOUNTERING THE PLACEHOLDER NODE, TRAVERSE TO A SECOND CHUNK VIA AN ANCESTOR CHUNK — 630

*FIG. 6*

SPATIALLY PARTITIONED IDEALLY CHUNKED ENTITY TREE

TECHNICAL FIELD

Examples of the disclosure are related to the field of computer software applications and services and, in particular, to data structures for software applications.

BACKGROUND

As businesses have spread across geographically distant locations, or moved to a hybrid work environment, collaboration applications and experiences are increasingly relied upon. A collaboration application is a software tool designed to facilitate real-time, interactive teamwork among users, regardless of their physical locations. These applications often incorporate features such as document sharing, simultaneous editing, and communication tools to enable seamless cooperation on projects, whether in the workplace or during remote collaborations. Collaboration applications have become increasingly essential in today's professional and private environments, fostering improved productivity and communication between users.

A limitation of collaboration applications, however, is the data structure utilized to create and store content as it is generated and revised within a collaborative document. Current data structures require at least one client that is accessing the document to upload and download an entire version of the document. That is, current data structuring techniques require entire versions of each distributed data structure for a given document to be downloaded in their entirety by accessing clients. Requiring that entire versions of the data structure for a collaborative document be downloaded (or uploaded) each time the document is edited, revised, or even accessed, has high storage and bandwidth costs, and high latency requirements for users joining collaboration sessions.

While some current data structuring techniques, such as B-tree data structures break down data into sub-categories, such as "branches" and "leaves", B-trees still require sub-categories of data to be downloaded in their entirety for an application to navigate to a given data endpoint. That is, to navigate between "leaves" on the B-tree, the application must load the respective branch and surrounding leaves. Moreover, B-trees require data to be represented in a linear fashion. Similarly, while "binary blobs," such as bitmaps are uploaded and downloaded separately, the underlying data structures themselves have no incrementality and thus do not scale well.

Accordingly, there is a need for improved data structuring techniques for collaboration applications. Specifically, there is a need for improved data structuring techniques that reduce processor and storage requirements of accessing clients, as well as reduce latency and bandwidth requirements for clients joining collaboration sessions.

SUMMARY

Technology disclosed herein includes software applications and services that provide one or more Spatially Partitioned Ideally Chunked Entity ("SPICE") tree functions. For example, the following discussion provides techniques for generating a SPICE tree data structure as well as one or more SPICE tree functions for fetching data corresponding to an application using the SPICE tree data structure. To address processor, memory, latency, and bandwidth costs present within current data structures and related techniques, the SPICE tree data structure "chunks" or splits data into chunks and provides a novel structure for navigating between related chunks.

In an example, the techniques provided herein provide for determining that a document is defined by a SPICE tree data structure. The SPICE tree data structure includes a root chunk containing two or more radar nodes. Each of the radar nodes includes a reference that provides direction to a respective chunk. Each of the chunks contains one or more object nodes. The object nodes correspond to a respective document attribute. In some cases, an object node is a primitive value, such as a number, Boolean, text character, and the like. To traverse between chunks within the SPICE tree data structure, one or more chunks may contain a placeholder node. A placeholder node provides a reference to another chunk based on the position of the placeholder node within a respective chunk. As will be described in greater detail below, the root chunk and the chunks are arranged in a hierarchical arrangement with the root chunk being a parent to one or more chunks. As content is modified in a respective document, the SPICE tree data structure automatically rebalances to maintain a balanced, isomorphic arrangement of chunks and radar nodes within the root chunk.

This Summary is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many Examples of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

FIG. 2 provides an illustrative example of chunking data within a data structure, according to an embodiment provided herein;

FIG. 6 provides an example flow for using or navigating a SPICE tree data structure, according to an embodiment herein;

DETAILED DESCRIPTION

Figure 1:
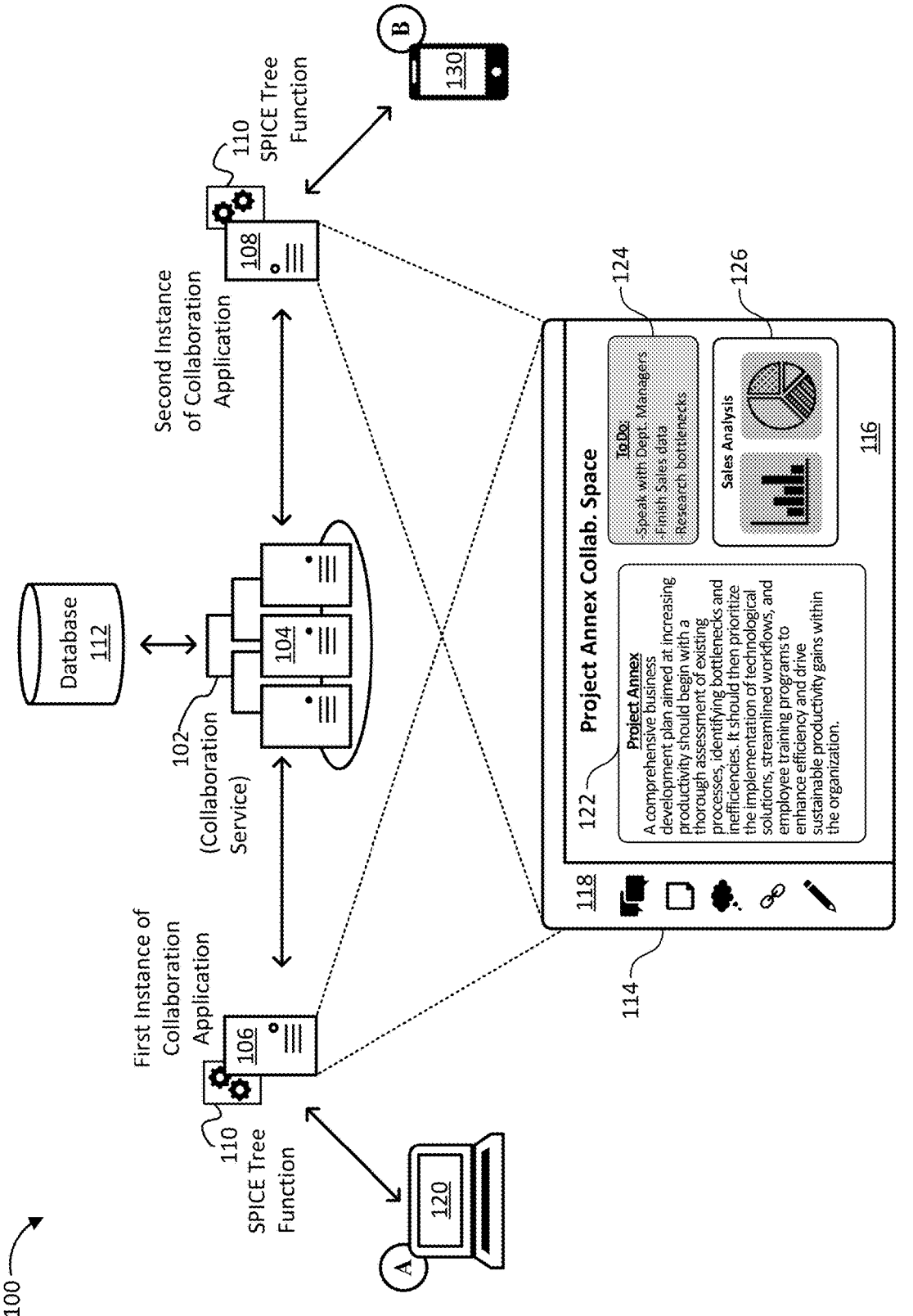
FIG. 1 illustrates an operational environment for providing one or more SPICE tree functions, according to an embodiment herein.

Examples are described herein in the context of systems and methods for providing one or more SPICE tree functionalities for accessing and storing application data. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Collaboration applications, and their related platforms, are increasingly relied upon within professional and personal environments as both increasingly move toward hybrid structures. Since collaboration applications allow for separate client devices to access and edit the same content (e.g., a collaborative document) irrespective of the client devices' geographical location, collaboration applications have grown in importance both within the business sphere, as well as in the personal sphere. Currently, collaboration applications, however, have high storage, latency, and bandwidth costs for accessing client devices.

Many of these processing and storage issues of collaboration applications are due to the current underlying data structures used to retrieve data (e.g., content) corresponding to a given collaborative document. For example, using current data structures and associated retrieval techniques require at least one client device that is part of a collaboration session, involving accessing and/or editing a collaboration document to, to download the collaboration document in its entirety. And while some data structuring techniques, such as B-tree data structures allow for sub-categories of data to be downloaded, B-trees still require the sub-categories of data to be downloaded in their entirety for an application to navigate to a given object within a document. As can be appreciated, by requiring entire sub-categories of data or the entire document itself to be downloaded during a session in which a user only navigates to and/or edits a minor portion of the document, results in higher processing and memory requirements for accessing client devices, as well as increases bandwidth and latency impacts of joining collaboration sessions. Moreover, these burdens impact the scale of projects by becoming more pronounced the larger the document becomes.

While the following discussion focuses on collaboration applications for ease of explanation, it should be appreciated that similar processing, memory, bandwidth, and latency issues are also present in document scenarios such as those involving a sole client device accessing a document stored by a remote service application. Similar to the collaboration application example above, if a user of a client device accesses a document, the client device is required to download the majority, if not the entirety, of the document using current data structuring techniques. Thus, regardless of what content within the document the client device is viewing or modifying, the client device must still retain enough processing, memory, and bandwidth to download and upload data for the entire document.

To address the shortcomings of current data structures and related techniques, examples of a Spatially Partitioned Ideally Chunked Entity ("SPICE") tree data structure, and related data structuring functions ("SPICE tree functions") are provided herein. By using a SPICE tree data structure for a collaboration application, the application can quickly access only portions of a document that are needed in a given collaboration session. Since the SPICE tree data structure allows the application to quickly access only those portions of a document that are needed in a given user session, and for those portions to be reasonably up to date, the application is required to only make a few edits, if any. This in turn requires an inexpensive way to continually maintain one or more "snapshots" of the document at moments of interest in the document's history.

As will be described in greater detail below, document data is chunked (or split) into a desired encoding size and arranged such that an application loads only a "chunk" of data as it is accessed during a collaboration session. That is, data associated with the content of a document is chunked into an encoding size that is optimized for network transmission and/or storage operations. Chunking the data using one or more of the SPICE tree functions provided herein yields a performance "sweet spot" between the two extremes of a) transmitting/receiving an entire copy of the document each time is needed or must be updated, which wastes bandwidth, has high latency, and may exhaust the memory of some devices and b) transmitting/receiving individual document elements, which would have enormous overhead with modern network and storage architectures, and would therefore also have high latency. As such, the SPICE tree data structure and related SPICE tree functions reduce bandwidth and latency impacts of joining a collaboration session, as well as lower the processing and memory requirements of accessing client devices.

Turning now to FIG. 1, FIG. 1 illustrates an operational environment 100 for providing one or more SPICE tree functions, according to an embodiment herein. In particular, the operational environment 100 illustrates providing one or more SPICE tree functions during a collaboration session. As illustrated, the operational environment 100 includes a collaboration service 102 providing a first instance 106 of a document and a second instance 108 of the document. The first instance 106 and the second instance 108 of the document are for the same document, hosted by the collaboration service 102. As will be described in greater detail below, the first instance 106 is provided to a user A via a client device 120 and the second instance 108 is provided to a user B via a client device 130.

As shown, the collaboration service 102 employs one or more server computers 104 co-located with respect to each other or distributed across one or more data centers. Example servers include web servers, application servers, virtual or physical servers, or any combination or variation thereof, of which computing system 801 in FIG. 8 is broadly representative. The client devices 120 and 130 communicate with the collaboration service 102 via one or more internets and intranets, the Internet, wired and wireless networks, local area networks (LANs), wide area networks (WANs), or any other type of network or combination thereof. Examples of the client devices 120 and 130 may include personal computers, tablet computers, mobile phones, gaming consoles, wearable devices, Internet of Things (IoT) devices, and any other suitable devices, of which computing system 801 in FIG. 8 is also broadly representative.

Broadly speaking, the collaboration service 102 provides software application services to end points, such as the client devices 120 and 130, examples of which include collaborative productivity software for creating content (e.g., whiteboards, word processing, spreadsheets, and presentations). The client devices 120 and 130 may load and execute software applications locally that interface with services and resources provided by the collaboration service 102. The applications may be natively installed and executed applications, web-based applications that execute in the context of a local browser application, mobile applications, streaming applications, or any other suitable type of application. Example services and resources provided by the collaboration service 102 include front-end servers, application servers, content storage services, authorization and authentication services, and the like.

In the illustrated example, a user A may access a first instance 106 of a document provided by the collaboration service 102 via the client device 120. In this scenario, the first instance 106 of the document may be natively installed and executed on the client device 120. Simultaneously, the user B may access the second instance 108 of the document provided by the collaboration service 102 via the client device 130. The second instance 108 of the document is a browser-based application that the user B accesses via a mobile application on the client device 130. Those skilled in the art will readily appreciate the various methodologies in which the first and second instances 106 and 108 of the collaboration application are accessed using the client devices 120 and 130, respectively.

The collaboration application provided by the first instance 106 and the collaboration application provided by the second instance 108 are the same collaboration application. For ease of explanation, the following discussion will involve the collaboration application being a whiteboard application, however, those skilled in the art will appreciate that any other type of software application may be equally applicable. Moreover, as noted above, while the following discussion focuses on collaboration applications accessed by more than one client device, non-collaborative applications are also envisaged. For example, scenarios in which the client device 120 accesses a productivity application (e.g., a word processing document) are equally applicable to the following description.

The collaboration application, provided by the collaboration service 102, is a digital platform that facilitates seamless communication and cooperation among individuals or teams, enabling them to work together on projects, share resources, and exchange information in a centralized and efficient manner. Here, the collaboration application, provided by the collaboration service 102 allows the user A and the user B to work together on a whiteboard 114. As such, the user A accesses the whiteboard 114 via the first instance 106 of the document and the user B accesses the whiteboard 114 via the second instance 108 of the document.

When accessing the whiteboard 114, the user A and the user B can make modifications or edits to content 116 of the whiteboard 114. For example, the whiteboard 114 may include elements 118 that allow for content 116 to be added, removed, or edited within the whiteboard 114. As illustrated, the content 116 of the whiteboard 114 may include components 122, 124, and 126. As can be appreciated, the components 122, 124, and 126 may be or include content 116 in a variety of formats, such as text, numbers, formulas, tables, ink, pictures, key/value maps, sets, links, audio, video, 3D models, and so forth. Since the whiteboard 114 is a collaboration application, any modifications made by the user A and the user B will be made across both the first instance 106 and the second instance 108. That is, if the user A, via the client device 120, adds another graph to the component 126 within the first instance 106 of the document, then the additional graph within the component 126 will be present in the second instance 108 of the document and viewable to the user B on the client device 130.

During conventional collaboration sessions using standard data structures and related techniques, one or both of the client devices 120 and the 130 is required to download a "snapshot" of the entire document from the collaboration service 102. That is, during a collaboration session, the majority, if not all, of the data for the whiteboard 114 is downloaded from a database 112 via the collaboration service 102 onto either the client device 120 and/or the client device 130. Although the database 112 is illustrated as separate from the collaboration service 102, in some embodiments, it may be part of the collaboration service 102, hosted by the same party that hosts the collaboration service 102, or hosted by a third party that is separate from the collaboration service 102.

As those skilled in the art will readily appreciate, the database 112 stores and maintains the data (e.g., files) corresponding to the content of the whiteboard 114. When the whiteboard 114 is accessed during a collaboration session, such as via the first instance 106 or the second instance 108 of the document, the collaboration service 102 follows a protocol to fetch the data associated with the whiteboard 114. The protocol to fetch the data associated with the whiteboard 114 follows logic that includes the structure of the data, also known as the data structure. That is, the data structure for the whiteboard 114 refers to the organization and storage of data within the database 112 in a way that allows for access, retrieval, and manipulation by the collaboration application.

As noted above, current data structures and techniques require that a "snapshot" of the entire whiteboard 114 be downloaded by one or both of the client devices 120 and 130 during a collaboration session. By downloading the data corresponding to the whiteboard 114, the client devices 120 and 130 can navigate through the content 116 of the whiteboard 114 without latency issues. Additionally, as modifications/edits are made to the content 116 of the whiteboard 114, those changes are made to the "snapshot" that is saved locally on one or both client devices 120 and 130. Once the collaboration session is terminated, the modified "snapshot" is then uploaded to the collaboration service 102 and stored in the database 112. In this manner, when the whiteboard 114 is accessed at a later date, the modifications made to the whiteboard 114 during the collaboration session with the user A and the user B are present.

As can be appreciated, however, requiring one or both of the client devices 120 and 130 to download the entirety or a large portion of the data corresponding to the whiteboard 114 has processor and storage implications. That is, if the client device 120 is downloading and storing the "snapshot" of the whiteboard 114, the client device 120 must have enough memory for the download. And even if the client device 120 has enough memory for the download, storing the "snapshot" reduces the remaining memory of the client device 120 available for performing other functions required of the client device 120. Additionally, downloading and uploading the "snapshot" of the entire whiteboard 114 impacts the bandwidth available for the client device 120, thereby reducing the availability of bandwidth for other functions required of the client device 120.

To reduce the processing, storage, and bandwidth requirements needed to access a collaboration session, such as the illustrated whiteboard 114, a SPICE tree function 110 is provided herein. The SPICE tree function 110 provides a SPICE tree data structure and related techniques for storing and accessing a document hosted by collaboration application, such as the whiteboard 114. As will be described in greater detail below with the respect to FIGS. 2A-7, the SPICE tree function 110 allows the client devices 120 and 130 to access and modify only content 116 within the whiteboard 114 that is navigated to. In other words, if the user A via the first instance 106 of the document navigates to the component 126 on the whiteboard 114, then the SPICE tree function 110 accesses and provides only the data corresponding to the component 126. Since the user A has only navigated to the component 126, and the other content within the whiteboard 114 are irrelevant to the user A at this given time, the SPICE tree function 110 does not fetch (e.g., download), the data associated with the other content. In other words, the SPICE tree function 110 is a reading protocol or framework for accessing and retrieving data corresponding to the content 116.

As illustrated, the SPICE tree function 110 is executed as part of the collaboration application. That is, when the user A initiates the first instance 106 of the document, the SPICE tree function 110 is executed and run as part of the first instance 106. Similarly, when the user B initiates the second instance 108 of the document, the SPICE tree function 110 is executed and run as part of the second instance 106. As will be appreciated, in other examples, the SPICE tree function 110 may be locally installed and executed by the client devices 120 and 130, may be remotely executed by the application service 102 when the client devices 120 and 130 initiate a collaboration session, or by any other application or function that is used to access and fetch data associated with the whiteboard 114 during a collaboration session.

To provide only portions of the data within the whiteboard 114 as the user A or the user B navigates to the respective content, the SPICE tree function 110 "chunks" or splits the data corresponding to the content 116 of the whiteboard 114. Turning now to FIG. 2, FIG. 2 provides an illustrative example of chunking data within a data structure 200, according to an embodiment herein. As shown, the data structure 200 includes multiple nodes 232. Each of the nodes 232 corresponds to an object, such as a document attribute. As used herein, a document attribute includes one or more text, numbers, formulas, tables, ink, pictures, key/value maps, sets, links, audio, video, 3D models, text or paragraph formatting, color scheme, etc.

Each of the nodes 232 within the data structure 200 are connected via a link 234. The link 234 provides directions as to what nodes 232 are related to each other, such that when the data structure 200 is "read" by the SPICE tree function 110 (e.g., reading protocol or software program that fetches data from the data structure 200 when a user accesses the program) the program knows how the nodes fit together. For example, if node 236 is for text, then node 238 may be an object relating to the font for the text data within the node 236 and node 240 may be an object relating to the color for the text data within the node 236. Because the nodes 236, 238, and 240 are connected via links 234, then the software program reads them together to accurately generate text within the program for a viewing user having the correct font and text color. It should be noted that the nodes 236, 238, and 240 are illustrative embodiments of nodes 232.

Following conventional data structures and related techniques, when a document, such as the whiteboard 114 is accessed by a user, the entirety of the data structure 200 may be downloaded. As described, downloading the entirety of the data structure 200 may be resource intensive on the client devices 120 and 130 accessing the whiteboard 114. Although data structure 200 only includes thirty nodes 232, it should be appreciated that in real applications, the data structure 200 may include hundreds of thousands, if not millions, of nodes 232. The data structure 200 and the following data examples include a limited number of nodes 232 for ease of illustration and description.

Since each of the nodes 232 corresponds to a piece of data, each node 232 has a corresponding encoding size. Encoding size refers to the amount of data required to represent information (e.g., the nodes 232) in a particular format or encoding scheme. Typically, encoding size is measured in bits, bytes, or other units of digital storage. Since the data structure 200 may contain hundreds of thousands, if not millions of nodes 232, the total encoding size of the data structure 200 may be quite large. As such, downloading the entirety of the data structure 200 during a collaboration session can impact the resources of the accessing client device.

To mitigate the resources required to access a document, such as the whiteboard 114 during a collaboration session, the SPICE tree function 110 chunks or splits data structure 202, which may be the same as the data structure 200, into multiple chunks 242A-F. Again, for ease of illustration, the data structure 202 is split into six chunks 242A-F, however, in reality the data structure 202 may be split into hundreds, if not thousands of chunks 242A-F depending on the number of nodes 232 present within the data structure 202. As will be described in greater detail below with respect to FIG. 3, the data structure 202 is split into six chunks 242A-F based on the encoding size of the nodes 232.

Chunking the data structure 202 as illustrated in FIG. 2 at this point is similar to conventional data structuring techniques. As shown, each of the chunks 242A-F are connected via links 234. As such, if a user navigates to a point in a document in which data corresponding to node 240 is required, the collaboration application must fetch data from all the intervening nodes between the node 232 and the node 240. Those skilled in the art may recognize this type of data structuring technique to be similar to a balanced tree ("B-tree") data structure. Under B-tree data structures, however, although the entirety of the nodes 232 within the data structure 202 are not used (e.g., viewed) by an accessing user to navigate to the node 240, all the intervening nodes 232 within the chunks 242A, 242C, and 242F are required, as well as all node descendants, which would include all of the nodes within the data structure 202. As such, such data structures and related techniques still have heavy processing, memory, and bandwidth costs.

Figure 3:
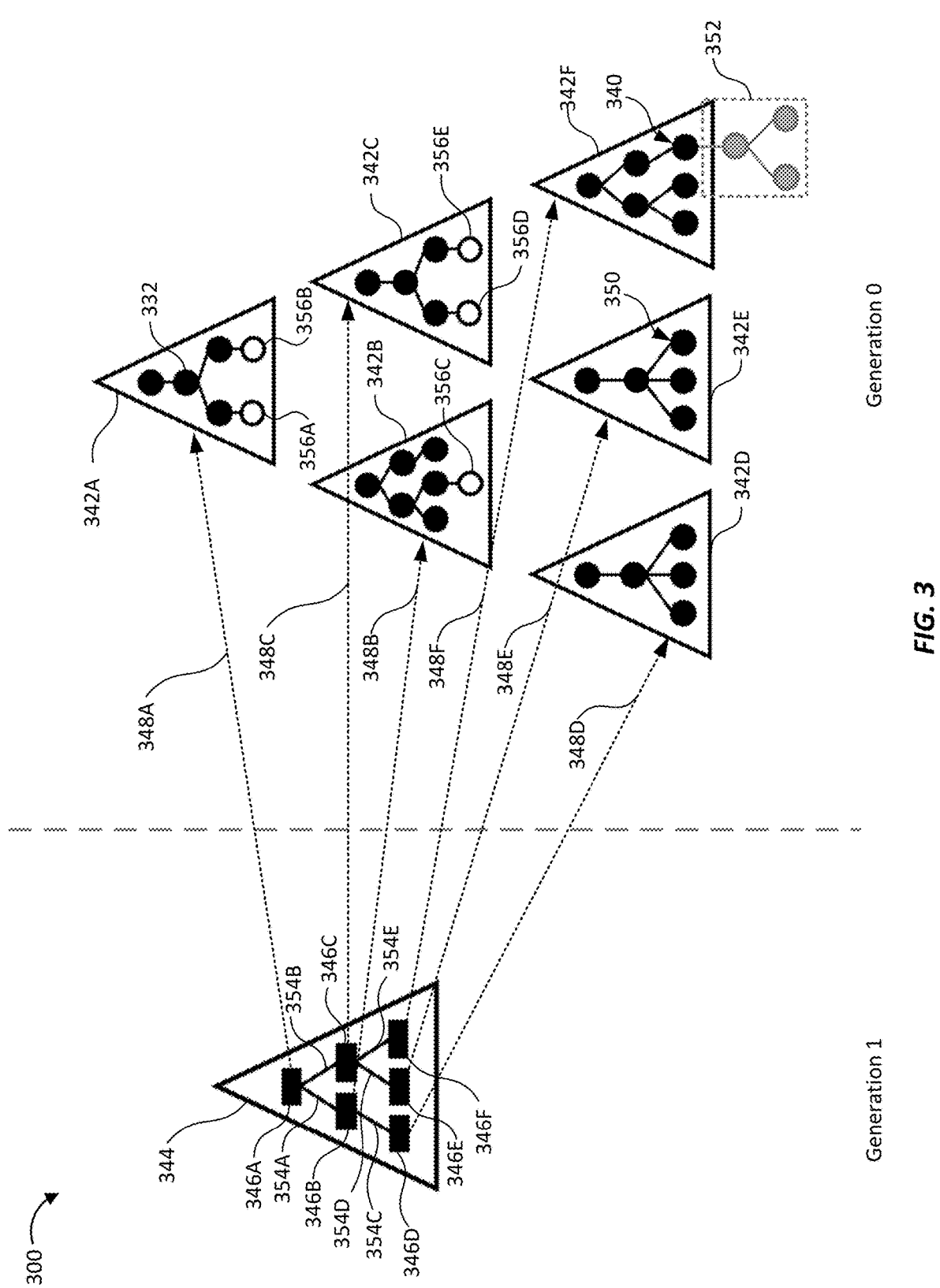
FIG. 3 illustrates an example SPICE tree data structure, according to an embodiment herein.

Referring now to FIG. 3, an example SPICE tree data structure 300 is provided, according to an embodiment herein. The SPICE tree data structure 300 includes a root chunk 344 and one or more of chunks 342A-F, which may be the same or similar to the chunks 242A-F. As shown, the root chunk 344 includes one or more radar nodes 346A-346F corresponding to a respective chunk 342A-F. That is, the root chunk 344 includes a radar node 346A providing a reference 348A to the chunk 342A, a radar node 346B providing a reference 348B to the chunk 342B, a radar node 346C providing a reference 348C to the chunk 342C, a radar node 346D providing a reference 348D to the chunk 342D, a radar node 346E providing a reference 348E to the chunk 342E, and a radar node 346F providing a reference 348F to the chunk 342F.

As shown, each of the chunks 342A-F are not connected to an adjacent chunk by a link, such as was illustrated in FIG. 2 and described with respect to current data structuring techniques. Instead, to traverse between chunks 342A-F, a respective reference may be used. That is, if a user is navigating between content within a document corresponding to the node 340 on chunk 342F and the node 350 in the chunk 342E, the SPICE tree function 110 follows the reference 348F from the chunk 342F to the root chunk 344. In some embodiments, the root chunk 344 may already be in memory at the client device. As such, the SPICE tree function 110 may navigate the downloaded root chunk 344 to follow the reference 348F directly to the radar node 346F.

Once at the root chunk 344, the SPICE tree function 110 traverses from the radar node 346F to the radar node 346E, and then follows the reference 348E to the chunk 342E. The SPICE tree function 110 then traverses through the object nodes 332 of the chunk 342E until it reaches the node 350. The specific steps of such a navigation process are described in greater detail below with respect to FIGS. 5A and 5B. As can be appreciated by this example, although the references 348A-F are illustrated as extending from the root chunk 344 to a respective chunk 342A-F, each reference 348A-F is a two-way reference between the chunks 342A-F and a respective radar node 346A-F within the root chunk 344.

The radar nodes 346A-F of the root chunk 344 are isomorphic of an arrangement of the chunks 342A-F. That is because the radar nodes 346A-F are proxies for the data within each of the chunks 342A-F, and thus the relational arrangement of the radar nodes 346A-F mirrors that of the chunks 342A-F. Depending on the relational arrangement of the chunks 342A-F, the radar nodes 346A-F are connected via links 354A-E. For example, the link 354A connects the radar node 346A to the radar node 346B, thereby indicating that the content corresponding to the object nodes 332 in the chunk 342A is related to the content corresponding to the object nodes 332 in the chunk 342B. For example, the content corresponding to the object nodes 332 in the chunk 342A may be on a first page of a document and the content corresponding to the object nodes 332 in the chunk 342B may be on a second page. The link 354A therefore indicates to the SPICE tree function 110 to traverse from the radar node 346A to the radar node 346B, and thus to the object nodes 332 on the chunk 342A via the reference 348B when a user scrolls from the first page of the document to the second page.

In addition to the object nodes 332, one or more of the chunks 342A-F may include a placeholder node 356A-E. A placeholder node 356A-E may include a reference directing the SPICE tree function 110 to traverse upstream to an ancestor chunk (e.g., to a respective node in a higher generation chunk), here to the root chunk 344, to identify a path to the next node 332. As will be described in greater detail below with respect to FIG. 5, when a placeholder node 356A-E is encountered, such as the placeholder 356A on the chunk 342A, the SPICE tree function 110 is directed back to the root chunk 344 to determine the next step. As illustrated, the arrangement of the placeholder nodes 354A-E within the chunks 342A-F provides context on the relationship of the object nodes 332 between the chunks 342A-F. For example, if the SPICE tree function 110 traverses through the object nodes 332 on the chunk 342A and reaches the placeholder node 356A, the position of the placeholder node 356A includes a reference directing the SPICE tree function 110 to return to the root chunk 344 and traverse via the link 354A to the radar node 346B. Similarly, if the SPICE tree function 110 traverses through the object nodes 332 on the chunk 342A and reaches the placeholder node 356B, the position of the placeholder node 356B includes a reference directing the SPICE tree function 110 to return to the root chunk 344 and traverse via the link 354B to the radar node 346C.

The SPICE tree data structure 300 can have any shape by maintaining a self-organizing hierarchy of approximations of the logical tree at increasingly coarse levels of detail. That is, the SPICE tree data structure 300 is a self-organizing data structure that rebalances itself based on the addition or reduction of nodes 332. Object nodes 332 are added to the SPICE tree data structure 300 when content is added to the document (e.g., the whiteboard 114) and object nodes 332 are removed from the SPICE tree data structure 300 when content is removed from the document. Additionally, as illustrated, the chunks 342A-F and the root chunk 344 are arranged in a hierarchical arrangement with the root chunk 344 as a parent to the chunks 342A-F, while the chunks 342A-F themselves have parent, child, and sibling relationships.

As noted above, the SPICE tree data structure 300 is a self-organizing data structure that rebalances itself. Rebalancing of the SPICE tree data structure 300 means that the SPICE tree data structure 300 adds and subtracts chunks 342A-F to maintain chunks of the same encoding size. That is, as content is edited within a document, object nodes 332 are added or reduced from the SPICE tree data structure 300. As object nodes 332 are added or subtracted, the encoding size of a given chunk changes. For example, if content is added to the document, nodes 352 are added to the SPICE tree data structure 300. Since the nodes 352 relate to the node 340, the nodes 352 are associated with chunk 342F. However, if the nodes 352 were added to the chunk 342F, the chunk 342F would no longer be in the same size range as other chunks 342A-E, thus making the SPICE tree data structure 300 unbalanced.

To balance, the SPICE tree data structure 300, the object nodes 332 and the chunks 342A-F are automatically rebalanced based on the encoding size of the present object nodes 332. Rebalancing is a process of splitting and/or merging chunks to maintain the chunks in a desired size range. The object nodes 332 are chunked into respective chunks 342A-F based on a variety of factors, such as an encoding size and a maximum depth of the SPICE tree data structure 300.

In an example implementation, the number of object nodes 332 present within a given chunk of the chunks 342A-F is determined by an encoding size equation, such as follows:

$$N = 2n + b \times n$$

where, N is the number of object nodes 332 within a given chunk, n is an encoding size of a node 332, and b is a buffer factor. As noted above, the encoding size is generally in bytes. The buffer factor, b, may be set on an application basis, a document basis, or the resource requirements of devices handling the SPICE tree data structure 300, such as the database 112, the application service 102, or the client devices 120 and 103. In an example, the buffer factor is 0.1, 0.2, 0.3, 0.4, or 0.5.

During the chunking operation, including rebalancing the SPICE tree data structure 300, it is assumed that all the object nodes 332 are the same size. In reality, however, the object nodes 332 may be different sizes, and thus the buffer factor, b, provides a buffer for the object nodes 332 to vary slightly in size. The buffer factor also allows for minor edits to be made to data without causing rebalancing of the SPICE tree data structure 300. As can be appreciated, without the buffer factor, b, the smallest of modifications to content within a document would cause constant rebalancing. As such, the buffer factor, b, allows for some encoding size leeway before rebalancing the nodes.

In some embodiments, data is chunked into the chunks 342A-F based on the document data format. That is, object nodes 332 that correspond to adjacent document attributes that are within a proximity limit to each other within a document may be grouped together. For example, the object nodes 332 within the chunk 342F correspond to document attributes relating to the same content within a document, such as text within a given paragraph. That is, one of the object nodes 332 may relate to text of the paragraph, the other nodes may relate to the formatting of the font and paragraph formatting for the paragraph. In another example, the object nodes 332 in the chunk 342E may correspond to a large list of elements, where each of the object nodes 332 in the chunk 342E correspond to one of the elements in the list.

As illustrated, the SPICE tree data structure 300 includes a depth of two layers or generations. Generation one is the least granular component of the SPICE tree data structure 300, providing the root chunk 344 including only radar nodes 346A-F. In other words, the generation one only provides directions as to where object nodes 332 can be found but does not provide any object nodes 332 itself. Only by following the references 348A-F are the object nodes 332 encountered at generation zero. Generation zero, or the second layer of the SPICE tree data structure 300, includes more granularity than generation one because it provides the object nodes 332 that can direct a SPICE tree function 110 to the specific document data.

As noted above, another consideration during a rebalancing process is the depth of the SPICE tree data structure 300. Like B-tree data structures, the SPICE tree data structure 300 rebalances to maintain a uniform depth. In preferred examples, the depth of the SPICE tree data structure 300 remains relatively shallow, such as containing less than five generations, less than four generations, or less than three generations. To maintain a uniform depth that is relatively shallow, a rebalancing process may be accomplished as an O(k log n) operation, where n is the number of chunks covered by content added to the document (e.g., additional content) and/or content removed from the document (reductional content) and k is proportional to the average number of document attributes (e.g., nodes 332) per chunk 342A-F.

As can be appreciated, when content is removed from a document (e.g., reductional content), nodes 332 are removed from a respective chunk 342A-F. When the chunk 342A-F reaches an encoding size that is below an encoding floor threshold, then the object nodes 332 remaining in the respective chunk 342A-F is merged into another chunk 342A-F. In other words, when the chunk 342A-F falls below an encoding floor threshold and reaches an encoding size that is too small, then the remaining nodes 332 are merged into another chunk 342A-F. In particular, the remaining nodes 332 are merged into an adjacent chunk 342A-F. In some cases, an adjacent chunk 342A-F having the lowest encoding size is selected for merging since merging the remaining nodes 334 into an adjacent chunk 342A-F requires the lowest number of rebalancing steps.

When content is added to a document (e.g., additional content), new nodes 352 are added to the SPICE tree data structure 300. As noted above, the nodes 352 correspond to the node 340. As such, the new nodes 352 are added following the node 340. Adding the new nodes 352 to the chunk 342F causes the encoding size of the chunk 342F to be above an encoding threshold. That is, adding the new nodes 352 to the chunk 342F causes the encoding size of the chunk 342F to be too large. As such, the new nodes 352 may be temporarily added to the chunk 342F, upon which an encoding threshold is reached or exceeded, causing the SPICE tree data structure 300 to rebalance.

As can be appreciated, the encoding floor threshold and the encoding threshold may be the bounds of an acceptable encoding size for a given chunk of data. That is, the encoding floor threshold may be a lower bound and the encoding threshold may be an upper bound for the range of encoding sizes acceptable within a given chunk. Since the SPICE tree data structure 300 is a self-balancing data structure, each of the chunks 342A-F may be approximately the same encoding size. Thus, each of the chunks 342A-F may have an encoding size that falls between an encoding floor threshold and an encoding threshold. The threshold limits for both the encoding floor threshold and the encoding threshold may be set on an application basis, document basis, or the resource requirements of devices handling the SPICE tree data structure 300, such as the database 112, the application service 102, or the client devices 120 and 130.

Figure 4:
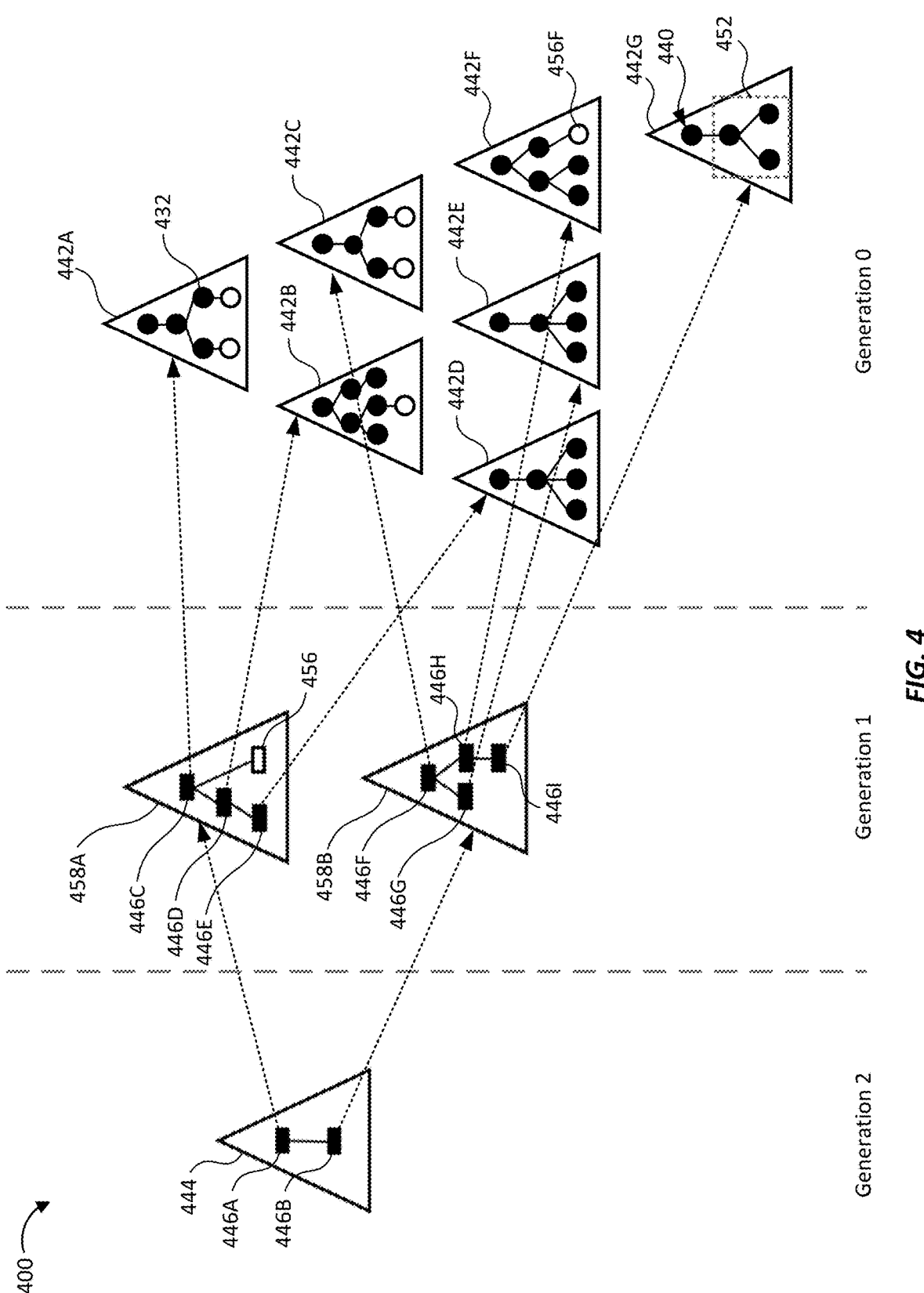
FIG. 4 illustrates another example SPICE tree data structure, according to an embodiment herein.

To accommodate the new nodes 352 within the SPICE tree data structure 300, the SPICE tree data structure 300 rebalances itself to add at least another chunk. Referring now to FIG. 4, another example SPICE tree data structure 400 is illustrated, according to an embodiment herein. In the illustrated example, the SPICE tree data structure 400 may be a rebalanced version of the SPICE tree data structure 300. As shown, to accommodate new nodes 452, which may be the same as the new nodes 352, the SPICE tree data structure 400 rebalances to add a chunk 442G. The chunk 442G is added to chunks 442A-F, which may be the same or similar to the chunks 342A-F.

Beyond rearranging to simply add another chunk 442G to include the new nodes 452, the SPICE tree data structure 400 rebalances to add another generation or layer. Here, two reference chunks 458A and 458B are added to the SPICE tree data structure 400. Instead of adding another radar node 346A-E to the root chunk 344, the reference chunks 458A and 458B are added to the SPICE tree data structure 400. Since chunking the data is meant to allow for quick retrieval of only accessed portions of a document, rebalancing the SPICE tree data structure 400 as illustrated, allows the SPICE tree function 110 to easily and directly identify, access, and fetch data associated with respective nodes 442 without having to navigate through multiple chunks 342A-F and nodes 332.

In the illustrated example, the reference chunks 458A and 458B are generated by splitting the root chunk 344. That is, the root chunk 344 is split into the two reference chunks 458A and 458B. In some cases, one of the reference chunks 458A and 458B may retain the identity of the root chunk 344. For example, in such scenario, the reference chunks 458A and 458B may be identified as reference chunk 458A and reference chunk 344. Since one or more of the reference chunks 458A and 458B may retain the identity of the reference chunk 344, and the reference chunks 458A and 458B are generated by the splitting of the reference chunk 344, a new root chunk 444 is generated.

As shown, the root chunk 444 now includes two radar nodes 446A and 446B, each of which provides a reference to the reference chunks 458A and 458B, respectively. Then, each of the reference chunks 458A and 458B includes one or more radar nodes 446C-I, each of which includes a reference pointing to a respective chunk 442A-G. Since the reference chunks 458A and 458B are adjacent, in that they provide directions to content that is adjacent or related within the respective document, the reference chunk 458A includes a placeholder node 456. When the placeholder node 456 is encountered, the placeholder node 456 provides a reference back to the root chunk 444, where the SPICE tree function 110 is directed to traverse to the radar node 446B to continue fetching data.

As is noted above, the new nodes 452 contain data corresponding to content that is adjacent or related to the content associated with node 440. As such, during the rebalancing, the node 440 is chunked with the new nodes 452 in the chunk 445G. To link the object nodes 432 in the chunk 442F with the node 440 (as they are also adjacent or related to each other), a placeholder node 456F is placed in the chunk 442F where the node 340 was previously in FIG. 3. The placeholder node 456F provides a reference to direct the SPICE tree function 110, when encountered, to return to the reference chunk 458B and traverse from the radar node 446H to the radar node 446I. Following the radar node 446I, the SPICE tree function 110 is directed to the node 440 on the chunk 442G.

Figure 5A:
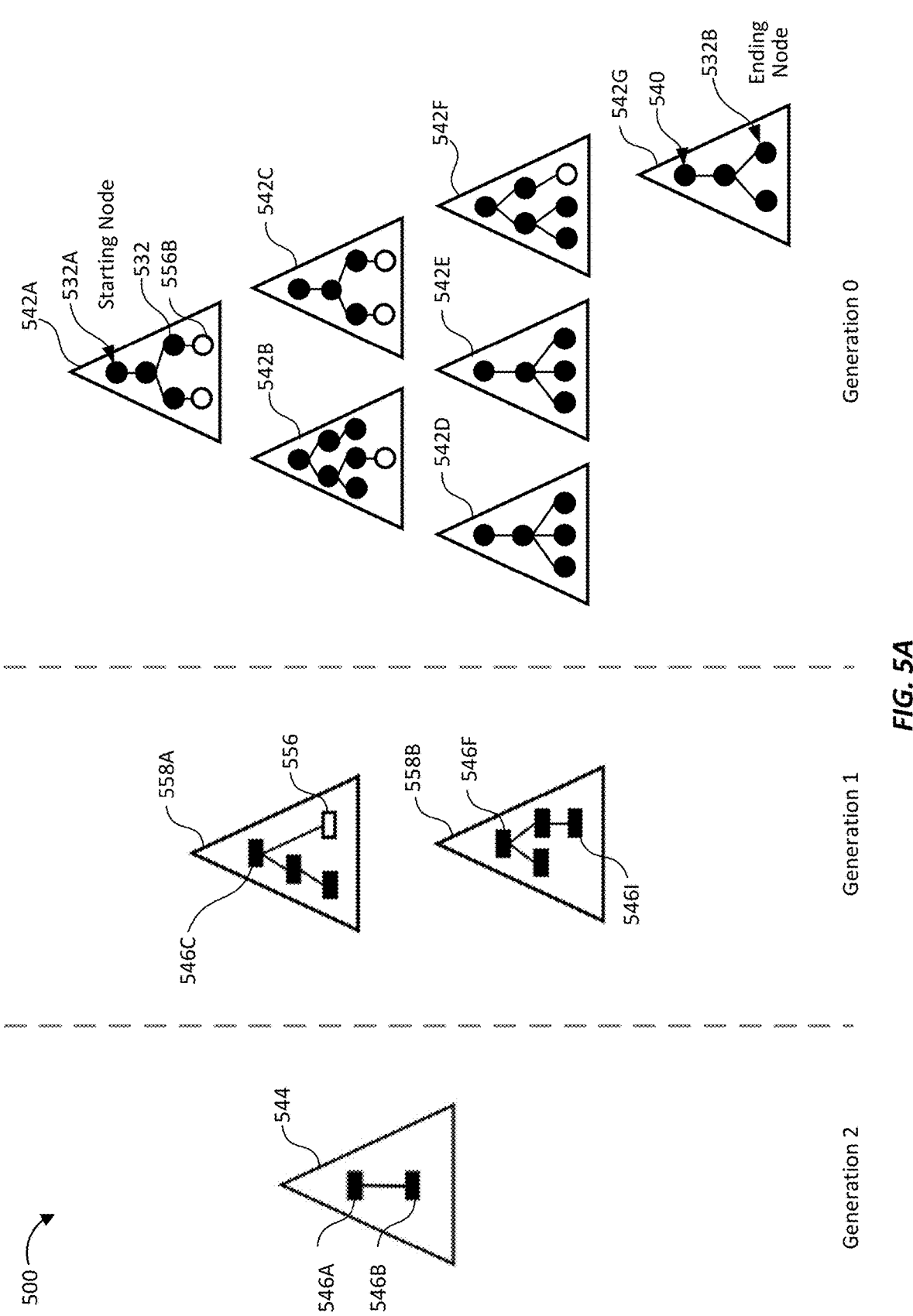
FIGS. 5A and 5B illustrate an example technique for using or navigating a SPICE tree data structure, according to an embodiment herein.
Figure 5B:
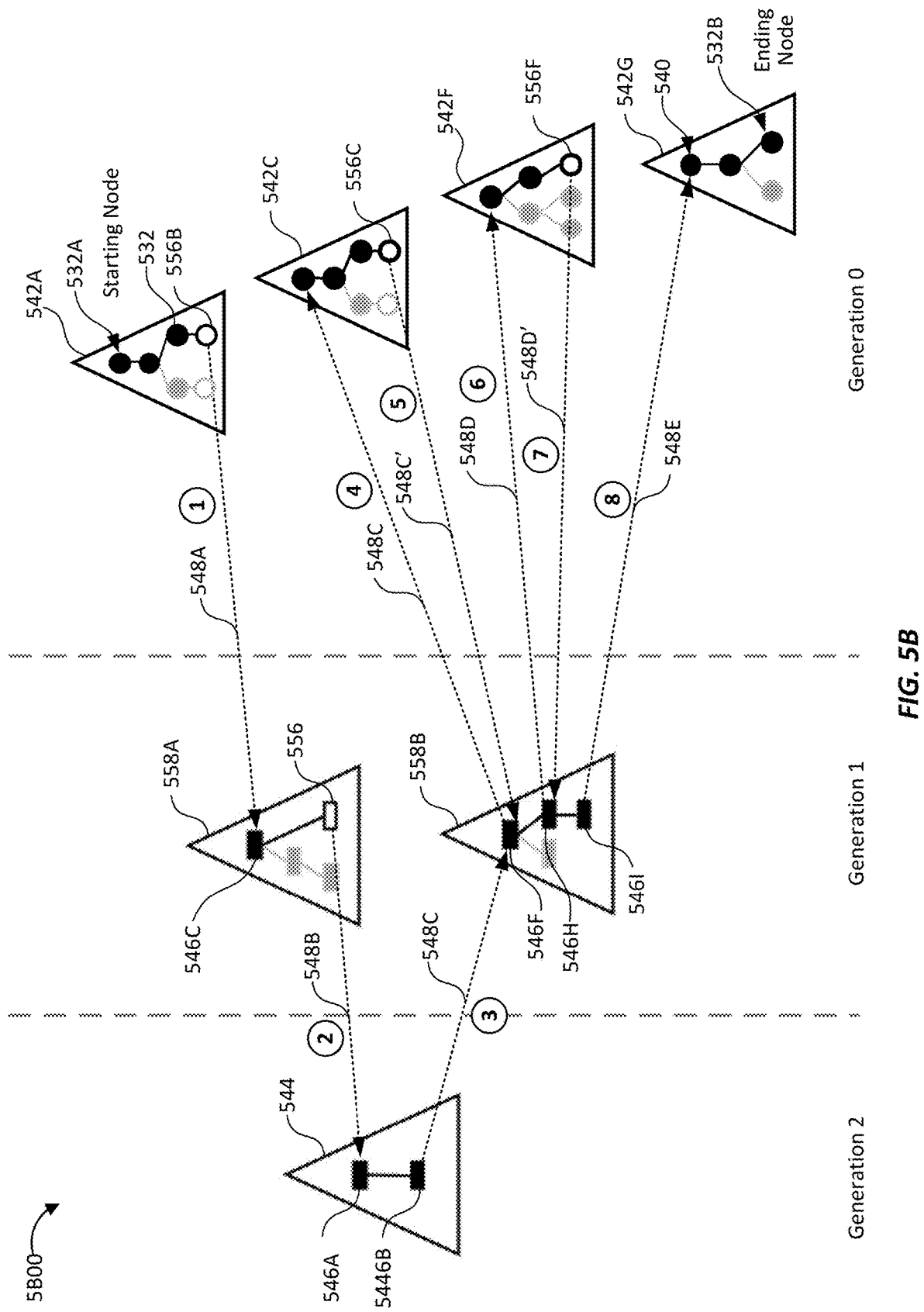
Figure 7:
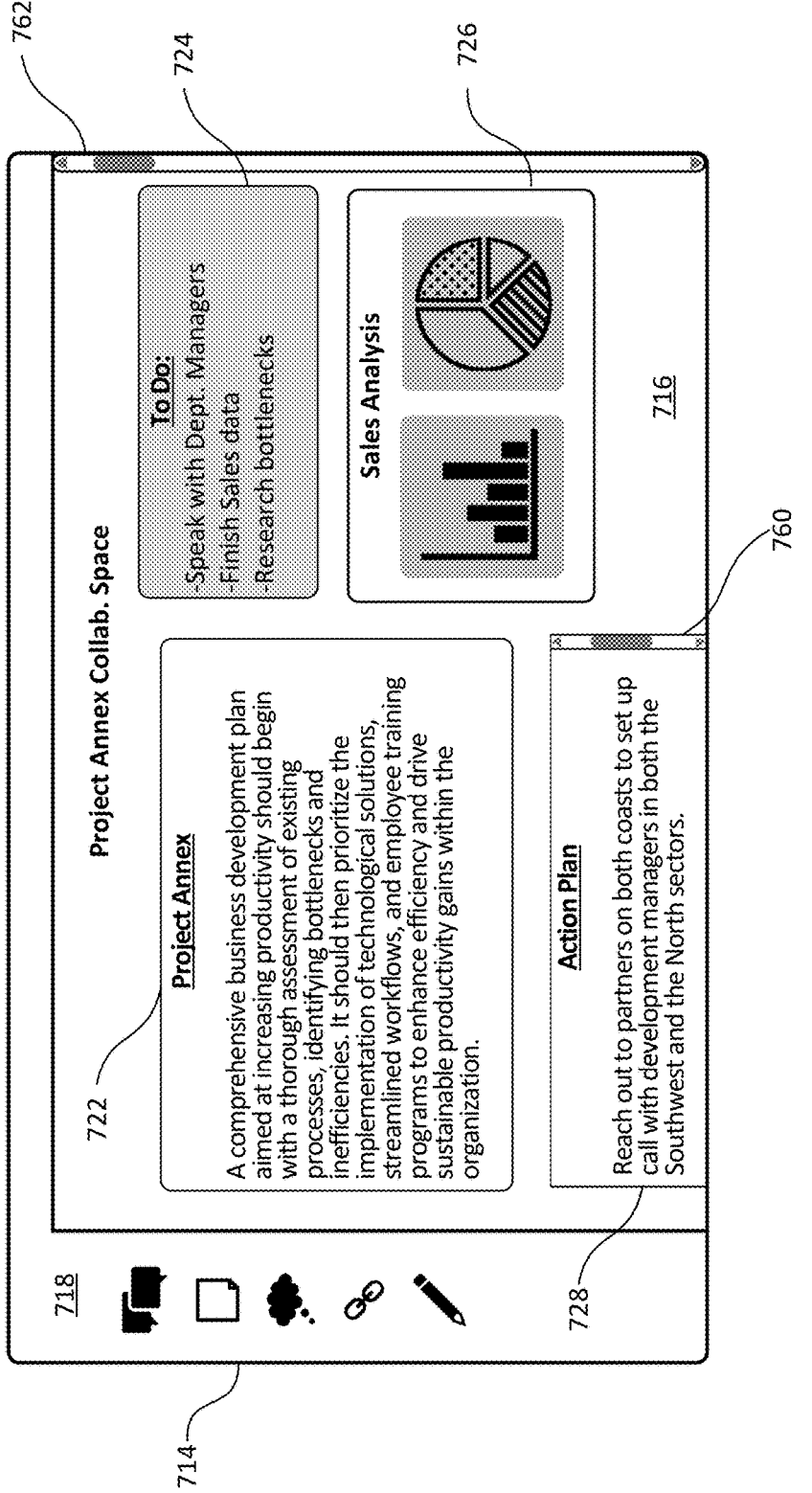
FIG. 7 illustrates a graphical user interface (GUI) that is provided by an application navigating the SPICE tree data structure of FIG. 5, according to an embodiment herein.

Turning now to FIGS. 5A-B, an example technique for using or navigating a SPICE tree data structure 500 is illustrated, according to an embodiment herein. For illustrative purposes, FIGS. 5A-B is described with respect to FIGS. 6 and 7. Specifically, FIG. 6 provides an example flow 600 for using or navigating the SPICE tree data structure 500 provided in FIGS. 5A-B, and FIG. 7 illustrates an example graphical user interface (GUI) 700 that may be provided via an application as the SPICE tree data structure 500 is navigated using the flow 600 illustrated in FIG. 6, according to an embodiment herein.

Starting with FIG. 5A, the SPICE tree data structure 500, which may be the same or similar to the SPICE tree data structure 400, includes a root chunk 544, reference chunks 558A and 558B, and chunks 542A-G. The root chunk 544 contains radar nodes 546A and 546B containing references directing to the reference chunks 558A and 558B, respectively. As described above with respect to FIG. 4, each of the reference chunks 558A and 558B contain radar nodes containing references to a respective one of the chunks 542A-G, each of which contains one or more object nodes 532.

Each of the object nodes 532 corresponds to a respective document attribute for a document. For example, FIG. 7 provides the GUI 700 of a document, such as whiteboard 714. The whiteboard 714 may be the same or similar to the whiteboard 114. For example, the whiteboard 714 contains content 716. The content 716 includes components 722, 724, 726, and 728. A user may edit the content 716 of the whiteboard 714 using one or more of elements 718. The elements 718 may include content creation and modification tools.

The whiteboard 714 may be provided to a user via the client device 120. As the user navigates the whiteboard 714, the SPICE tree function 110 is used to fetch data corresponding to the content 716 of the whiteboard 714. That is, the SPICE tree function 110 may fetch objects corresponding to the content 716 following the flow 600. With reference to FIG. 6, to initiate the SPICE tree function 110, a determination is made that the document, here, the white-board 714, is defined by the SPICE tree data structure 500 (605). A document may be defined by a SPICE tree data structure when the SPICE tree function 110 is executed for generation, storage, and/or retrieval of data corresponding to the document. Here, the whiteboard 714 is defined by the SPICE tree data structure 500.

Since the whiteboard 714 is defined by the SPICE tree data structure 500, as the user navigates the content 716 of the whiteboard 714, the SPICE tree data structure 500 is navigated by the SPICE tree function 110 to fetch respective data (610). To navigate the content 716 of the whiteboard 714, a first object node is identified (615). The first object node is associated with respective content within the document. For example, with reference to GUI 700, if the user navigates from component 722 to an off-screen portion of the component 728 using the scrollbar 760, then the SPICE tree function 110 needs to fetch the data corresponding to the content of the off-screen portion of the component 728.

To do so, the SPICE tree function 110 first identifies a starting point. For example, the SPICE tree function 110 identifies the first object node or starting node 532A on the SPICE tree data structure 500 (615). The starting node 532A is part of the chunk 542A and corresponds to current content within the whiteboard 714. That is, the starting node 532A corresponds to data for currently displayed or provided content. If the user opens the whiteboard 714, whatever data is fetched to display the whiteboard 714 upon opening is the current content. As can be appreciated, current content is whatever content that is being currently displayed or provided to a user via the GUI 700.

As the user moves throughout the content within the white board 714, the SPICE tree function 110 navigates the respective nodes within the SPICE tree data structure 500 to fetch respective data attributes. For the following discussion, the user navigates from content associated with the starting node 532A to content associated with the ending node 532B. As such, the SPICE tree function 110 identifies the second object node (e.g., ending node 532B) that is associated with the respective content that the user wants to view or navigates to (620). Here, the respective content is the off-screen portion of the component 728 on the whiteboard 714. As can be appreciated, navigation and fetching of the data to respective content using the SPICE tree function 110 is nearly simultaneous, thus providing minimal latency between a user navigating a document and the respective content being displayed (e.g., fetched). The second object node is illustrated as ending node 532B on the SPICE tree data structure 500. As shown, the ending node 532B is part of the chunk 542G. Thus, to navigate from the starting node 532A to the ending node 532B, the SPICE tree function 110 must navigate the SPICE tree data structure 500.

Turning now to FIG. 5B, a navigation process is illustrated to fetch data as the user viewing the GUI 700 navigates from content associated with the starting node 532A to content associated with the ending node 532B. For ease of illustration, the chunks 542B, 542D, and 542E are removed from the depiction of the SPICE tree data structure 500. The chunks 542B-E are removed from the illustration because data corresponding to the object nodes 532 within these chunks will not be fetched during the navigation process. It should be appreciated that under conventional data structures and related techniques, this data would be fetched or downloaded. It should also be appreciated that while the SPICE tree data structure 500 only includes a smaller number of object nodes 532 and thus not having to fetch the object nodes 532 within the chunks 542B-E implicates minimal resource savings, that in real applications the SPICE tree data structure 500 may have billions of object nodes 532 and thousands to millions of chunks. As such, by only having to navigate between the adjacent chunks, as is described in the illustrated navigation process, the SPICE tree data structure 500 and related SPICE tree function 110 provide enhanced resource savings over conventional techniques.

To navigate from the starting node 532A to the ending node 532B, the SPICE tree function 110 traverses from the starting node 532A through the object nodes 532 of the chunk 542A until a placeholder node 556B is encountered (625). The route that the SPICE tree function 110 traverses through the object nodes 532 of the chunk 542A (e.g., following the right-hand path vs. the left-hand path), is determined by what content the user is navigating through within the whiteboard 714. When the placeholder node 556B is encountered, the SPICE tree function 110 traverses to the chunk 542G, and ultimately to the ending node 532B by traversing back to an ancestor chunk (630). That is, as illustrated, when the placeholder node 556B is encountered, the SPICE tree function 110 traverses upstream via a reference 548A to the reference chunk 558A. The reference chunk 558A is an ancestor chunk to the chunk 542G, as is the root chunk 544. At the reference chunk 558A, the SPICE tree function 110 traverses to a placeholder 556, which directs the SPICE tree function 110 upstream to the root chunk 544 via reference 548B. The SPICE tree function 110 traverses to the placeholder 556 instead of following the left-hand path in the reference chunk 558A because of the position of the placeholder 558B in the chunk 542B. As noted above, the arrangement of the radar nodes within the reference chunks 558A-B are isomorphic of the chunks 542A. Thus the arrangement of the nodes within the chunks 542A-F provide direction as to the path that the SPICE tree function 110 should follow when traversing the SPICE tree data structure 500.

Once at the root chunk 544, the SPICE tree function 110 traverses from the radar node 546A to the radar node 546B. The radar node 546B includes a reference 548C that directs the SPICE tree function 110 to the reference chunk 558B. At the reference chunk 558B, the SPICE tree function 110 traverses through each of the radar nodes 546F and 546H to the reference chunk 546I, where it is ultimately directed via reference 548D to the chunk 542G. That is, from the radar node 546F the SPICE tree function 110 traverses via reference 548C to the first object node 532 in the chunk 542C. Once in the chunk 542C, the SPICE tree function 110 traverses through the object nodes 532 until a placeholder node 556C is reached. As noted above, the path through the object nodes 532 within the chunk 542C depends on what content the user is navigating through within the whiteboard 714.

Once at the placeholder node 556C, the SPICE tree function 110 navigates upstream to the reference chunk 558B via reference 548C'. Back at the reference chunk 558B, the SPICE tree function 110 navigates to the next radar node 546H. From the radar node 546H the SPICE tree function 110 navigates via reference 548D to the chunk 542F and through the nodes 532 within the chunk 542F to placeholder node 556F. Again, the path through the nodes 532 within the chunk 542F is determined via the content that the user is navigating through in the whiteboard 714. Once to the placeholder node 556F, the SPICE tree function 110 navigates upstream to the reference chunk 558B via reference 548D'.

At the reference chunk 558B, the SPICE tree function 110 navigates to the next reference node 546I and to the chunk

542G via reference 548E. Once at the chunk 542G, the SPICE tree function 110 navigates from the object node 540 to the ending node 532B. As noted above, using the SPICE tree function 110 and the SPICE tree data structure 500 to navigate from the starting node 532A to the ending node 532B, data corresponding to all the nodes in the chunks 542B-E does not need to be fetched or downloaded via the application. Only the data corresponding to content that is being accessed or relevant to the user is retrieved and downloaded during a given session. For example, with reference to the GUI 700, the whiteboard 714 may include numerous pages of content 716 that the user is not being viewed or accessed by the user, as evident by scrolling bar 762. Since the user is not viewing or requiring the content on undisplayed pages of the whiteboard 714, the client device 120 does not need to retrieve or download that content. Retrieving and/or downloading such content would only tie up resources and be of little use to the user.

To provide sufficient context for displayed or accessed content, however, ancestry of a given node 532 may be loaded. That is, when the ending node 532B is encountered, the ancestry of the ending node 532B may be loaded or fetched by the SPICE tree function 110. The ancestry of the ending node 532B may include all of the nodes 532 present within the chunk 542G or only the nodes 532 that provide a direct link to the ending node 532B in the chunk 542G.

Figures 8A, 8B:
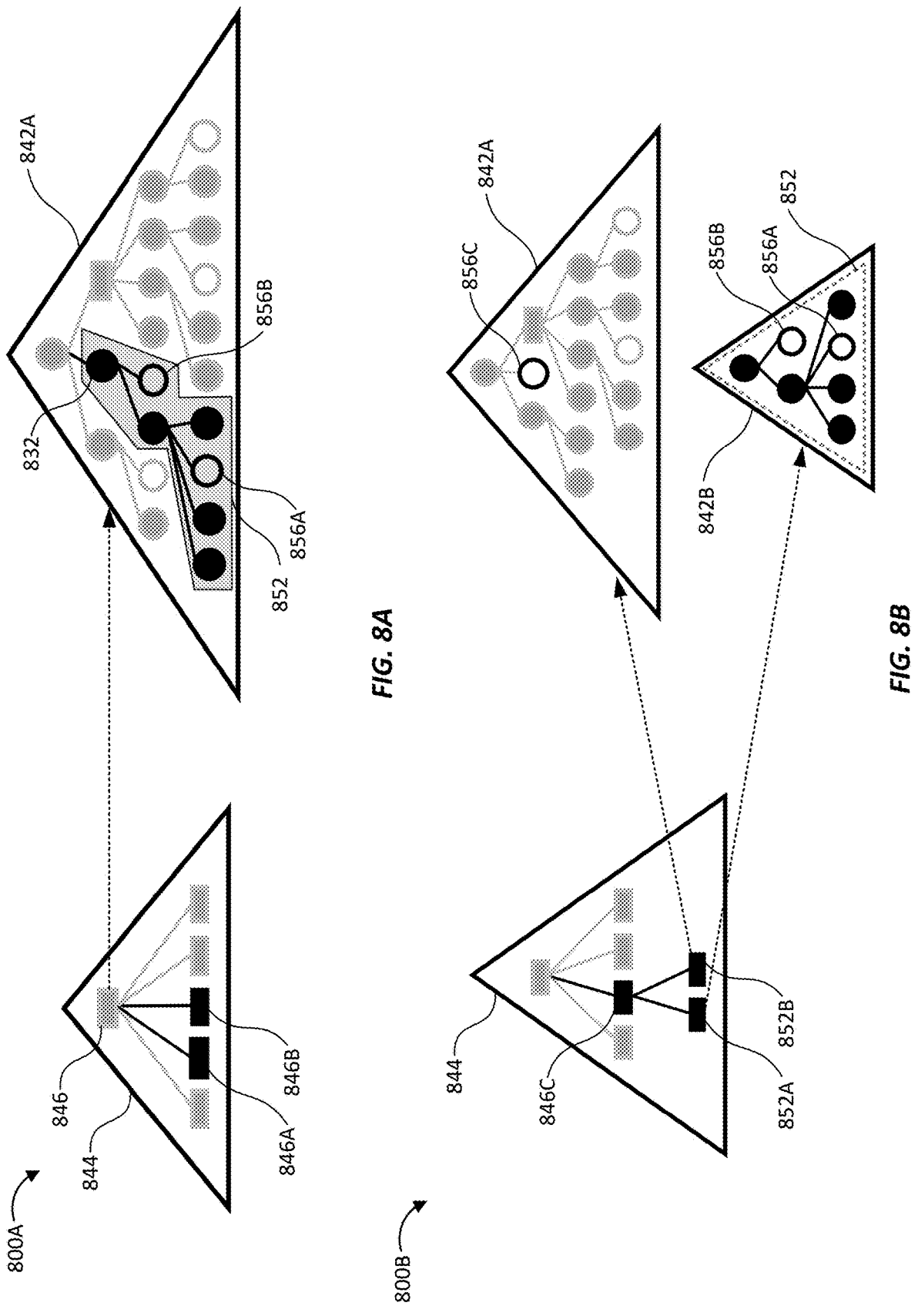
FIGS. 8A and 8B illustrates rebalancing of a SPICE tree data structure, according to an embodiment herein.

Turning now to FIGS. 8A and 8B, a rebalancing example of a SPICE tree data structure is provided, according to an embodiment herein. A SPICE tree data structure 800A is provided in FIG. 8A at a first time and a SPICE tree data structure 800B is provided in FIG. 8B at a second time. The SPICE tree data structures 800A and 800B are for the same document except that they illustrated different stages in a rebalancing process. That is, the SPICE tree data structures 800A and 800B illustrated different snapshots of content within a respective document. It should be appreciated that while the following discussion is described in the scenario that the second time is following the first time, the rebalancing scenario is equally applicable for if the second time preceded the first time, except the actions would be reversed. That is, instead of adding new nodes 852 based on additional content in the document, the nodes 852 would be removed based on reductive content in the document.

As shown, at a first time the SPICE tree data structure 800A includes a root chunk 844 having multiple radar nodes, including the radar nodes 846, 846A, and 846B. The radar node 846 provides a reference to a chunk 842A. The radar nodes 846A and 846B correspond to chunks (not shown) containing nodes 832 that are related to placeholder nodes 856A and 856B on the chunk 842A.

The chunk 842A includes multiple object nodes 832 corresponding to content in a respective document. At some point, additional content is added to the document. As such, new nodes 852 are added to the chunk 842A. At some point, one or more nodes may be added to a group of nodes 852 within the chunk 842A results in an encoding size being too large for the chunk 842A. As such, the SPICE tree data structure 800A rebalances.

FIG. 8B illustrates an example rebalanced SPICE tree data structure 800B. As shown, to accommodate the new nodes within the group of nodes 852, chunk 842B is added to the SPICE tree data structure 800B. To direct the SPICE tree function 110 during a reading protocol from the nodes 832 in the chunk 842A, a placeholder node 856C is added to the chunk 842A. Additionally, a new radar node 846C is added to the root chunk 844. Since the placeholder nodes 856A and 856B are now held in the chunk 842B, the corresponding radar nodes 852A and 852B are linked to the radar node 846C in the root chunk 844.

As those in the art can readily appreciate, the SPICE tree data structure examples provided herein, along with the rebalancing and chunking examples, are illustrated in simplistic form. As such, in application, the SPICE tree data structures and related rebalancing and chunking processes may be more complex, containing hundreds, if not thousands, of radar nodes, chunks, and placeholder nodes. That said, regardless of how many chunks, layers, and object nodes are present in a SPICE tree data structure, there will always be a sole root chunk that is the origination point for any reading protocol.

As is evident from the above description, the SPICE tree data structure and related function provide numerous benefits over conventional structures and techniques. One example benefit is with the SPICE tree data structure it is not necessary to read all the way to the leaves of hierarchical data—for example, by reading only to a certain depth, a high-level overview of a document could be displayed quickly to a user. Another example benefit is that the SPICE tree data structure and function can serve as the in-memory data structure loaded by applications because the information in adjacent chunks is always adjacent in the logical document data.

The SPICE tree data structure and function also provides the advantages of a) tracking the chunks that need to be uploaded to update the server snapshots and b) being a shallow balanced tree, and therefore enabling multiple versions of a document to be retained efficiently in memory (which is useful, for example, when users wish to visually compare two versions of a document). Also because of this adjacency, when navigation through the SPICE tree data structure requires additional chunks to be fetched, these fetches will be smaller in number and therefore have more consistent latency. That is, paths in the SPICE tree data structure are an optional pay-as-you-go performance tradeoff. One example is the in-memory portion of the document that is loaded by an application. When paths are stored, they require less space since in the SPICE tree data structure the paths do not need to extend all the way down to the leaves, only to an ancestor chunk. As such, loading the ancestry of a tree element (which is usually desirable so the application can consider its context) typically requires fewer network fetches with logical chunking. Avoiding non-local data in chunks lets the SPICE tree data structure use bandwidth more efficiently, especially when small parts of the document are loaded. Similarly, avoiding non-local data in chunks makes access rights to portions of a document easier to implement safely.

Additional advantages of the SPICE tree data structure and related functions include permission boundaries being easily forced to align with chunk boundaries in the SPICE tree data structure, so a server can simply check permissions for the chunk itself, rather than having to decode and partition it, before sending it. Moreover, with the SPICE tree data structure, it is easy to avoid undesirable chunk boundaries. For example, if an element's name, type and id are always read together, it is easy to ensure that they are always in the same chunk.

Figure 9:
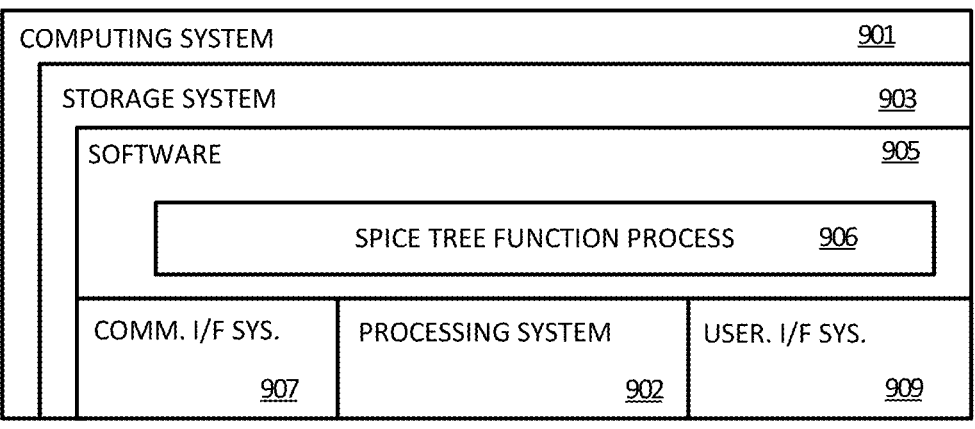
FIG. 9 shows an example client device suitable for providing one or more SPICE tree functions, according to an embodiment herein.

Referring still to FIG. 9, FIG. 9 illustrates a computing system 901 that be used for providing one or more SPICE tree functions, as described herein. For example, the client device 120 or 130 may be or include the computing system 901. As illustrated, the computing system 901 includes a processing system 902 that includes a microprocessor and other circuitry that retrieves and executes software 905 from storage system 903. The processing system 902 may be implemented within a single processing device but may also be distributed across multiple processing devices or subsystems that cooperate in executing program instructions. Examples of the processing system 902 include general purpose central processing units, graphical processing units, application specific processors, and logic devices, as well as any other type of processing device, combinations, or variations thereof.

The storage system 903 may comprise any computer readable storage media readable by processing system 902 and capable of storing software 905. The storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations the storage system 903 may also include computer readable communication media over which at least some of the software 905 may be communicated internally or externally. The storage system 903 may be implemented as a single storage device but may also be implemented across multiple storage devices or sub-systems co-located or distributed relative to each other. The storage system 903 may comprise additional elements, such as a controller capable of communicating with the processing system 902 or possibly other systems.

The software 905 (including SPICE tree function 906) may be implemented in program instructions and among other functions may, when executed by the processing system 902, direct the processing system 902 to operate as described with respect to the various operational scenarios, sequences, and processes illustrated herein. For example, the software 905 may include program instructions for implementing a SPICE tree function as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multithreaded, or in accordance with any other suitable execution paradigm, variation, or combination thereof. The software 905 may include additional processes, programs, or components, such as operating system software, virtualization software, or other application software. The software 905 may also comprise firmware or some other form of machine-readable processing instructions executable by the processing system 902.

In general, the software 905 may, when loaded into the processing system 902 and executed, transform a suitable apparatus, system, or device (of which computing system 901 is representative) overall from a general-purpose computing system into a special-purpose computing system customized to support insights features, functionality, and user experiences. Indeed, encoding the software 905 on the storage system 903 may transform the physical structure of the storage system 903. The specific transformation of the physical structure may depend on various factors in different implementations of this description. Examples of such factors may include, but are not limited to, the technology used to implement the storage media of the storage system 903 and whether the computer-storage media are characterized as primary or secondary storage, as well as other factors.

For example, if the computer readable storage media are implemented as semiconductor-based memory, the software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between the computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a computerized method for using a spatially partitioned ideally chunked entity (SPICE) tree, the computerized method comprising: determining a document defined by a SPICE tree data structure, the SPICE tree data structure comprising: a root chunk comprising a plurality of radar nodes; and a plurality of chunks, wherein: each chunk comprises one or more object nodes; each of the one or more object nodes corresponds to a document attribute; each of the plurality of radar nodes comprises a reference to one of the plurality of chunks; the one or more object nodes comprise a placeholder node that provides a reference to another chunk within the plurality of chunks based on a position of the placeholder node within a respective chunk; and the root chunk and the plurality of chunks are arranged in a hierarchical arrangement with the root chunk being a parent to one or more chunks within the plurality of chunks; and navigating to content within the document based on the SPICE tree data structure.

Example 2 is the computerized method of any previous or subsequent Example, wherein navigating to content within the document based on the SPICE tree data structure comprises: identifying a first object node of the one or more object nodes associated with current content within the document, wherein the first object node is in a first chunk of the plurality of chunks; identifying, a second object node of the one or more object nodes associated with the respective content; traversing, starting with the first object node, the one or more object nodes within the first chunk until a first placeholder node is encountered within the first chunk; and responsive to encountering the first placeholder node, traversing via the first placeholder node to a second chunk, wherein the second chunk comprises the second object node, and wherein traversing to the second chunk comprises: traversing to an ancestor chunk via the reference provided by the placeholder node; and traversing to a subsequent radar node within the ancestor chunk.

Example 3 is the computerized method of any previous or subsequent Example, the computerized method further comprising: determining edited content within the document, wherein the edited content corresponds to a modification to content within the document; determining one or more object nodes corresponding to the edited content; and modifying the one or more object nodes corresponding to the edited content, wherein one or more of the object nodes that are modified are in a first chunk.

Example 4 is the computerized method of any previous or subsequent Example, wherein: the edited content comprises additional content that is added to the document; and modifying the one or more object nodes corresponding to the edited content comprises: adding one or more additional object nodes corresponding to the additional content to the one or more object nodes within the first chunk; determining an encoding size for the one or more object nodes within the first chunk; determining that the encoding size for the one or more object nodes within the first chunk is above an encoding threshold; and adding a new chunk to the plurality of chunks, wherein the one or more object nodes are rearranged between the first chunk and the new chunk.

Example 5 is the computerized method of any previous or subsequent Example, wherein: the edited content comprises reductional content that is removed from the document; and modifying the one or more object nodes corresponding to the reductional content comprises removing one or more reductional object nodes corresponding to the reductional content from the one or more object nodes within the first chunk.

Example 6 is the computerized method of any previous or subsequent Example, wherein object nodes within a given chunk correspond to adjacent content within the document.

Example 7 is the computerized method of any previous or subsequent Example, wherein the data structure is a self-organizing data structure that rebalances based on an encoding size of the one or more object nodes within a given chunk.

Example 8 is the computerized method of any previous or subsequent Example, wherein a number of object nodes within a given chunk is determined by an encoding size equation, the encoding size equation comprising: $N=2n+b\times n$ wherein: N is the number of nodes within a given chunk; n is an encoding size of an object node; and b is a buffer factor.

Example 9 is the computerized method of any previous or subsequent Example, wherein navigating to content within the data structure further comprises loading an ancestry of a first object node within a first chunk, wherein the ancestry of the first object node comprises: determining a parent chunk for the first chunk; loading the one or more object nodes within the first chunk; and loading one or more object nodes within the parent chunk.

Example 10 is the computerized method of any previous or subsequent Example, the computerized method further comprising: determining that additional content is added to the document; adding one or more additional object nodes to the one or more object nodes within the first chunk, wherein the one or more additional object nodes correspond to the additional content added to the document; determining an encoding size for the one or more object nodes within the first chunk; determining that the encoding size for the one or more object nodes within the first chunk is above an encoding threshold; generate a new chunk within the plurality of chunks of the data structure; arranging the one or more object nodes between the first chunk and the new chunk; and adding a new radar node to the root chunk, wherein the new radar node comprises a reference pointing to the new chunk.

Example 11 is a non-transitory computer-readable medium comprising processor-executable instructions configured to cause one or more processors to: receive, from a client device, an indication to access a document defined by a data structure, the data structure comprising: a root chunk comprising a plurality of radar nodes; and a plurality of chunks, wherein: each chunk comprises one or more object nodes; each of the one or more object nodes corresponds to a document attribute; each of the plurality of radar nodes comprises a reference to one of the plurality of chunks; the one or more object nodes comprise a placeholder node that provides a reference to another chunk within the plurality of chunks based on position of the placeholder node within a respective chunk; and the root chunk and the plurality of chunks are arranged in a hierarchical arrangement with the root chunk being a parent to one or more chunks within the plurality of chunks; and navigate, responsive to input from the client device, to content within the document based on the data structure.

Example 12 is the non-transitory computer-readable medium of any previous or subsequent Example, wherein the processor-executable instructions to navigate, responsive to input from the client device, to content within the document based on the data structure cause the one or more processors to further execute processor-executable instructions stored in the non-transitory computer-readable medium to: identify a first object node of the one or more object nodes associated with current content within the document, wherein the first object node is in a first chunk of the plurality of chunks; identify, a second object node of the one or more object nodes associated with the respective content; traverse, starting with the first object node, the one or more object nodes within the first chunk until a first placeholder node is encountered within the first chunk; and responsive to encountering the first placeholder node, traverse via the first placeholder node to a second chunk, wherein the second chunk comprises the second object node, and wherein traversing to the second chunk comprises: traversing to the an ancestor chunk via the reference provided by the placeholder node; and traversing to a subsequent radar node within the ancestor chunk.

Example 13 is the non-transitory computer-readable medium of any previous or subsequent Example, wherein the processor-executable instructions cause the one or more processors to further execute processor-executable instructions stored in the non-transitory computer-readable medium to: determine, responsive to input from the client device, that additional content is added to the document; add one or more additional object nodes to the one or more object nodes within the first chunk, wherein the one or more additional object nodes correspond to the additional content added to the document; determine an encoding size for the one or more object nodes within a first chunk; determine that the encoding size for the one or more object nodes within the first chunk is above an encoding threshold; generate a new chunk within the plurality of chunks of the data structure; arrange the one or more object nodes between the first chunk and the new chunk; and add a placeholder node to the first chunk, wherein the placeholder node comprises a reference pointing to the new chunk.

Example 14 is the non-transitory computer-readable medium of any previous or subsequent Example, wherein the processor-executable instructions cause the one or more processors to further execute processor-executable instructions stored in the non-transitory computer-readable medium to: determine, responsive to input from the client device, that reductional content is removed from the document; remove one or more reductional object nodes from the one or more object nodes within a first chunk, wherein the one or more reductional object nodes correspond to the reductional content removed from the document; determine an encoding size for the one or more object nodes within the first chunk after the reductional object nodes are removed; determine that the encoding size for the one or more object nodes within the first chunk is below an encoding floor threshold; rebalance the one or more object nodes within the plurality of chunks, wherein rebalancing the one or more object nodes within the plurality of chunks comprises: removing the first chunk from the plurality of chunks; and rearranging the one or more object nodes into one or more other chunks within the plurality of chunks based on the encoding size of the one or more object nodes from the first chunk.

Example 15 is the non-transitory computer-readable medium of any previous or subsequent Example, wherein the processor-executable instructions cause the one or more processors to further execute processor-executable instructions stored in the non-transitory computer-readable medium to: load an ancestry of a first object node within a first chunk based on navigating to content within the data structure, wherein loading the ancestry of the first object node comprises loading the ancestry of the first object node comprises loading the one or more object nodes within the first chunk.

Example 16 is the non-transitory computer-readable medium of any previous or subsequent Example, wherein the processor-executable instructions to navigate to content within the document based on the data structure cause the one or more processors to further execute processor-executable instructions stored in the non-transitory computer-readable medium: identify a first radar node within the plurality of reference radar nodes corresponding to a first chunk; and traverse from the first radar node to the first chunk following the reference of the first radar node linking the first radar node to the first chunk.

Example 17 is the non-transitory computer-readable medium of any previous or subsequent Example, wherein the processor-executable instructions cause the one or more processors to further execute processor-executable instructions stored in the non-transitory computer-readable medium to: determine a modification to the content within the document; and rebalance the one or more object nodes within the plurality of chunks based on the modification, wherein rebalancing the one or more object nodes within the plurality of chunks comprises: removing a first chunk from the plurality of chunks; and rearranging the one or more object nodes into one or more other chunks within the plurality of chunks based on an encoding size of the one or more object nodes from the first chunk.

Example 18 is the non-transitory computer-readable medium of any previous or subsequent Example, wherein the processor-executable instructions cause the one or more processors to further execute processor-executable instructions stored in the non-transitory computer-readable medium to: determine a modification to the content within the document; determine an encoding size for one or more modified object nodes based on the modification; and rebalance the one or more object nodes within the plurality of chunks based on the encoding size.

Example 19 is a computerized method for building a spatially partitioned ideally chunked entity (SPICE) tree, the computerized method comprising: creating and storing data into a plurality of nodes within a data structure, wherein the data structure comprises: a root chunk comprising a plurality of radar nodes; and a plurality of chunks, wherein: each chunk comprises one or more object nodes; each of the one or more object nodes corresponds to a document attribute; each of the plurality of radar nodes comprises a reference to one of the plurality of chunks; the one or more object nodes comprise a placeholder node that provides a reference to another chunk within the plurality of chunks based on a position of the placeholder node within a respective chunk; and the root chunk and the plurality of chunks are arranged in a hierarchical arrangement with the root chunk being a parent to one or more chunks within the plurality of chunks; and chunking the data into the plurality of chunks, wherein chunking the data comprises: determining adjacent document attributes that are within a proximity limit to each other within the document; determining an encoding size for the adjacent document attributes; and arranging object nodes corresponding to the adjacent document attributes into one or more chunks of the plurality of chunks based on the encoding size.

Example 20 is the computerized method of any previous or subsequent Example, wherein the method further comprises: determining a modification to one or more document attributes; and rebalancing the one or more object nodes within the data structure based on the modification to the one or more document attributes, wherein rebalancing the one or more object nodes within the data structure comprises determining an encoding size for the plurality of object nodes.

What is claimed is:

1. A computerized method for using a spatially partitioned ideally chunked entity (SPICE) tree, the computerized method comprising:
    determining a document defined by a SPICE tree data structure, the SPICE tree data structure comprising:
        a root chunk;
        a plurality of reference chunks; and a plurality of chunks, wherein:

each chunk comprises one or more object nodes;

each reference chunk comprises one or more radar nodes;

each of the one or more object nodes corresponds to a document attribute;

each of the one or more radar nodes comprises a reference to one of the plurality of chunks;

the one or more object nodes comprise a placeholder node that provides a reference to another chunk within the plurality of chunks based on a position of the placeholder node within a respective chunk; and the root chunk, the plurality of reference chunks, and the plurality of chunks are arranged in a hierarchical arrangement with the root chunk being a parent to one or more reference chunks within the plurality of reference chunks;

and one or more reference chunks being a parent to one or more chunks within the plurality of chunks;

navigating to content within the document based on the SPICE tree data structure, wherein navigating to content within the document based on the SPICE tree data structure comprises:

identifying a first object node of the one or more object nodes associated with current content within the document, wherein the first object node is in a first chunk of the plurality of chunks;

identifying, a second object node of the one or more object nodes associated with the respective content;

traversing, starting with the first object node, the one or more object nodes within the first chunk until a first placeholder node is encountered within the first chunk; and responsive to encountering the first placeholder node, traversing via the first placeholder node to a second chunk, wherein the second chunk comprises the second object node, and wherein traversing to the second chunk comprises:

traversing to an ancestor chunk via the reference provided by the placeholder node, wherein the ancestor chunk comprises one of the root chunk or a respective reference chunk of the plurality of reference chunks; and traversing to a subsequent radar node within the ancestor chunk; and loading into memory only traversed chunks in which traversal occurs, such that chunks not traversed remain unloaded, wherein the traversed chunks comprise the first chunk, the ancestor chunk, and the second chunk.

2. The computerized method of claim 1, the computerized method further comprising:

determining edited content within the document, wherein the edited content corresponds to a modification to content within the document;

determining one or more object nodes corresponding to the edited content; and modifying the one or more object nodes corresponding to the edited content, wherein one or more of the object nodes that are modified are in a first chunk.

3. The computerized method of claim 2, wherein:

the edited content comprises additional content that is added to the document; and modifying the one or more object nodes corresponding to the edited content comprises:

adding one or more additional object nodes corresponding to the additional content to the one or more object nodes within the first chunk;

determining an encoding size for the one or more object nodes within the first chunk;

determining that the encoding size for the one or more object nodes within the first chunk is above an encoding threshold; and adding a new chunk to the plurality of chunks, wherein the one or more object nodes are rearranged between the first chunk and the new chunk.

4. The computerized method of claim 2, wherein:

the edited content comprises reductional content that is removed from the document; and modifying the one or more object nodes corresponding to the reductional content comprises removing one or more reductional object nodes corresponding to the reductional content from the one or more object nodes within the first chunk.

5. The computerized method of claim 1, wherein object nodes within a given chunk correspond to adjacent content within the document.

6. The computerized method of claim 1, wherein the data structure is a self-organizing data structure that rebalances based on an encoding size of the one or more object nodes within a given chunk.

7. The computerized method of claim 1, wherein a number of object nodes within a given chunk is determined by an encoding size equation, the encoding size equation comprising:

$$N = 2n + b \times n$$

wherein:

N is the number of nodes within a given chunk;

n is an encoding size of an object node; and b is a buffer factor.

8. The computerized method of claim 1, wherein navigating to content within the data structure further comprises loading an ancestry of a first object node within a first chunk, wherein the ancestry of the first object node comprises:

determining a parent chunk for the first chunk;

loading the one or more object nodes within the first chunk; and loading one or more object nodes within the parent chunk.

9. The computerized method of claim 1, the computerized method further comprising:

determining that additional content is added to the document;

adding one or more additional object nodes to the one or more object nodes within the first chunk, wherein the one or more additional object nodes correspond to the additional content added to the document;

determining an encoding size for the one or more object nodes within the first chunk;

determining that the encoding size for the one or more object nodes within the first chunk is above an encoding threshold;

generate a new chunk within the plurality of chunks of the data structure;

arranging the one or more object nodes between the first chunk and the new chunk; and adding a new radar node to the root chunk, wherein the new radar node comprises a reference pointing to the new chunk.

10. A non-transitory computer-readable medium comprising processor-executable instructions configured to cause one or more processors to:

receive, from a client device, an indication to access a document defined by a data structure, the data structure comprising:

a root chunk;

a plurality of reference chunks; and a plurality of chunks, wherein:

each chunk comprises one or more object nodes;

each of the one or more object nodes corresponds to a document attribute;

each of the plurality of reference chunks comprises one or more radar nodes;

each of the one or more radar nodes comprises a reference to one of the plurality of chunks;

the one or more object nodes comprise a placeholder node that provides a reference to another chunk within the plurality of chunks based on position of the placeholder node within a respective chunk; and the root chunk, the plurality of reference chunks, and the plurality of chunks are arranged in a hierarchical arrangement with the root chunk being a parent to one or more reference chunks within the plurality of reference chunks;

and one or more reference chunks being a parent to one or more chunks within the plurality of chunks; and navigate, responsive to input from the client device, to content within the document based on the data structure, wherein to navigate to the content within the document causes the one or more processors to further execute processor-executable instructions stored in the non-transitory computer-readable medium to:

identify a first object node of the one or more object nodes associated with current content within the document, wherein the first object node is in a first chunk of the plurality of chunks;

identify, a second object node of the one or more object nodes associated with the respective content;

traverse, starting with the first object node, the one or more object nodes within the first chunk until a first placeholder node is encountered within the first chunk;

responsive to encountering the first placeholder node, traverse via the first placeholder node to a second chunk, wherein the second chunk comprises the second object node, and wherein traversing to the second chunk comprises:

traversing to an ancestor chunk via the reference provided by the placeholder node, wherein the ancestor chunk comprises one of the root chunk or a respective reference chunk of the plurality of reference chunks; and traversing to a subsequent radar node within the ancestor chunk; and load into memory only traversed chunks in which traversal occurs, such that chunks not traversed remain unloaded, wherein the traversed chunks comprise the first chunk, the ancestor chunk, and the second chunk.

11. The non-transitory computer-readable medium of claim 10, wherein the processor-executable instructions cause the one or more processors to further execute processor-executable instructions stored in the non-transitory computer-readable medium to:

determine, responsive to input from the client device, that additional content is added to the document;

add one or more additional object nodes to the one or more object nodes within the first chunk, wherein the one or more additional object nodes correspond to the additional content added to the document;

determine an encoding size for the one or more object nodes within a first chunk;

determine that the encoding size for the one or more object nodes within the first chunk is above an encoding threshold;

generate a new chunk within the plurality of chunks of the data structure;

arrange the one or more object nodes between the first chunk and the new chunk; and add a placeholder node to the first chunk, wherein the placeholder node comprises a reference pointing to the new chunk.

12. The non-transitory computer-readable medium of claim 10, wherein the processor-executable instructions cause the one or more processors to further execute processor-executable instructions stored in the non-transitory computer-readable medium to:

determine, responsive to input from the client device, that reductional content is removed from the document;

remove one or more reductional object nodes from the one or more object nodes within a first chunk, wherein the one or more reductional object nodes correspond to the reductional content removed from the document;

determine an encoding size for the one or more object nodes within the first chunk after the reductional object nodes are removed;

determine that the encoding size for the one or more object nodes within the first chunk is below an encoding floor threshold;

rebalance the one or more object nodes within the plurality of chunks, wherein rebalancing the one or more object nodes within the plurality of chunks comprises:

removing the first chunk from the plurality of chunks; and rearranging the one or more object nodes into one or more other chunks within the plurality of chunks based on the encoding size of the one or more object nodes from the first chunk.

13. The non-transitory computer-readable medium of claim 10, wherein the processor-executable instructions cause the one or more processors to further execute processor-executable instructions stored in the non-transitory computer-readable medium to:

load an ancestry of a first object node within a first chunk based on navigating to content within the data structure, wherein loading the ancestry of the first object node comprises loading the ancestry of the first object node comprises loading the one or more object nodes within the first chunk.

14. The non-transitory computer-readable medium of claim 10, wherein the processor-executable instructions to navigate to content within the document based on the data structure cause the one or more processors to further execute processor-executable instructions stored in the non-transitory computer-readable medium:

identify a first radar node within the one or more radar nodes corresponding to a first chunk; and traverse from the first radar node to the first chunk following the reference of the first radar node linking the first radar node to the first chunk.

15. The non-transitory computer-readable medium of claim 10, wherein the processor-executable instructions cause the one or more processors to further execute processor-executable instructions stored in the non-transitory computer-readable medium to:

determine a modification to the content within the document; and rebalance the one or more object nodes within the plurality of chunks based on the modification, wherein rebalancing the one or more object nodes within the plurality of chunks comprises:

removing a first chunk from the plurality of chunks; and rearranging the one or more object nodes into one or more other chunks within the plurality of chunks based on an encoding size of the one or more object nodes from the first chunk.

16. The non-transitory computer-readable medium of claim 10, wherein the processor-executable instructions cause the one or more processors to further execute processor-executable instructions stored in the non-transitory computer-readable medium to:

determine a modification to the content within the document;

determine an encoding size for one or more modified object nodes based on the modification; and rebalance the one or more object nodes within the plurality of chunks based on the encoding size.

17. A computerized method for building a spatially partitioned ideally chunked entity (SPICE) tree, the computerized method comprising:

creating and storing data corresponding to a document into a plurality of nodes within a data structure, wherein the data structure comprises:

a root chunk;

a plurality of reference chunks; and a plurality of chunks, wherein:

each chunk comprises one or more object nodes;

each of the one or more object nodes corresponds to a document attribute;

each reference chunk comprises one or more radar nodes;

each of the one or more radar nodes comprises a reference to one of the plurality of chunks;

the one or more object nodes comprise a placeholder node that provides a reference to another chunk within the plurality of chunks based on a position of the placeholder node within a respective chunk; and the root chunk, the plurality of reference chunks, and the plurality of chunks are arranged in a hierarchical arrangement with the root chunk being a parent to one or more reference chunks within the plurality of reference chunks;

and one or more reference chunks being a parent to one or more chunks within the plurality of chunks;

chunking the data into the plurality of chunks, wherein chunking the data comprises:

determining adjacent document attributes that are within a proximity limit to each other within the document;

determining an encoding size for the adjacent document attributes; and arranging object nodes corresponding to the adjacent document attributes into one or more chunks of the plurality of chunks based on the encoding size; and navigating to content within the document based on the data structure by:

identifying a first object node of the one or more object nodes associated with current content within the document, wherein the first object node is in a first chunk of the plurality of chunks;

identifying, a second object node of the one or more object nodes associated with the respective content;

traversing, starting with the first object node, the one or more object nodes within the first chunk until a first placeholder node is encountered within the first chunk;

responsive to encountering the first placeholder node, traversing via the first placeholder node to a second chunk, wherein the second chunk comprises the second object node, and wherein traversing to the second chunk comprises:

traversing to an ancestor chunk via the reference provided by the placeholder node, wherein the ancestor chunk comprises one of the root chunk or a respective reference chunk of the plurality of reference chunks; and traversing to a subsequent radar node within the ancestor chunk; and loading into memory only traversed chunks in which traversal occurs, such that chunks not traversed remain unloaded, wherein the traversed chunks comprise the first chunk, the ancestor chunk, and the second chunk.

18. The computerized method of claim 17, wherein the method further comprises:

determining a modification to one or more document attributes; and rebalancing the one or more object nodes within the data structure based on the modification to the one or more document attributes, wherein rebalancing the one or more object nodes within the data structure comprises determining an encoding size for the one or more object nodes.

\* \* \* \* \*